United States Patent
Kano

(10) Patent No.: US 8,411,873 B2
(45) Date of Patent: Apr. 2, 2013

(54) NOISE CONTROL DEVICE

(75) Inventor: Hiroyuki Kano, Hyogo (JP)

(73) Assignee: Panasonic Corporation, Osaka (JP)

( * ) Notice: Subject to any disclaimer, the term of this patent is extended or adjusted under 35 U.S.C. 154(b) by 708 days.

(21) Appl. No.: 12/528,181

(22) PCT Filed: Dec. 24, 2008

(86) PCT No.: PCT/JP2008/003928
§ 371 (c)(1),
(2), (4) Date: Aug. 21, 2009

(87) PCT Pub. No.: WO2009/084186
PCT Pub. Date: Jul. 9, 2009

(65) Prior Publication Data
US 2010/0027804 A1 Feb. 4, 2010

(30) Foreign Application Priority Data
Dec. 27, 2007 (JP) .................................. 2007-336740

(51) Int. Cl.
*A61F 11/06* (2006.01)
(52) U.S. Cl. ................... 381/71.11; 381/71.1; 381/71.7; 381/71.8; 381/71.12; 381/71.14
(58) Field of Classification Search ............... 381/71.11, 381/71.1, 71.7, 71.8, 71.12, 71.14
See application file for complete search history.

(56) References Cited

U.S. PATENT DOCUMENTS
2007/0076896 A1* 4/2007 Hosaka et al. ............. 381/71.11
2007/0233478 A1* 10/2007 Sakamoto et al. ............ 704/233

FOREIGN PATENT DOCUMENTS

| JP | 2-285799 | 11/1990 |
|---|---|---|
| JP | 03-203792 | 9/1991 |
| JP | 04-298792 | 10/1992 |
| JP | 09-101789 | 4/1997 |
| JP | 09101789 A * | 4/1997 |
| JP | 2007-272008 | 10/2007 |

OTHER PUBLICATIONS

International Search Report mailed Mar. 17, 2009 for International Application No. PCT/JP2008/003928.

* cited by examiner

*Primary Examiner* — Vivian Chin
*Assistant Examiner* — Paul Kim
(74) *Attorney, Agent, or Firm* — Wenderoth, Lind & Ponack, L.L.P.

(57) ABSTRACT

A noise control device eliminates a possibility that a noise arriving at a control point is increased as compared to a case where noise control is not performed and has a reduced circuit scale. The device includes a controlling noise detector for detecting a given noise to output a controlling noise signal, a controlling filter section for signal-processing the controlling noise signal, by using a preset fixed filter coefficient, to output a control signal, and a control speaker for reducing the given noise, by emitting toward the control point a control sound based on the control signal. The device also includes a noise determination section for determining whether the given noise is a noise corresponding to the fixed filter coefficient, and an output control section for stopping output of the control signal from the controlling filter section when the given noise does not correspond.

20 Claims, 27 Drawing Sheets

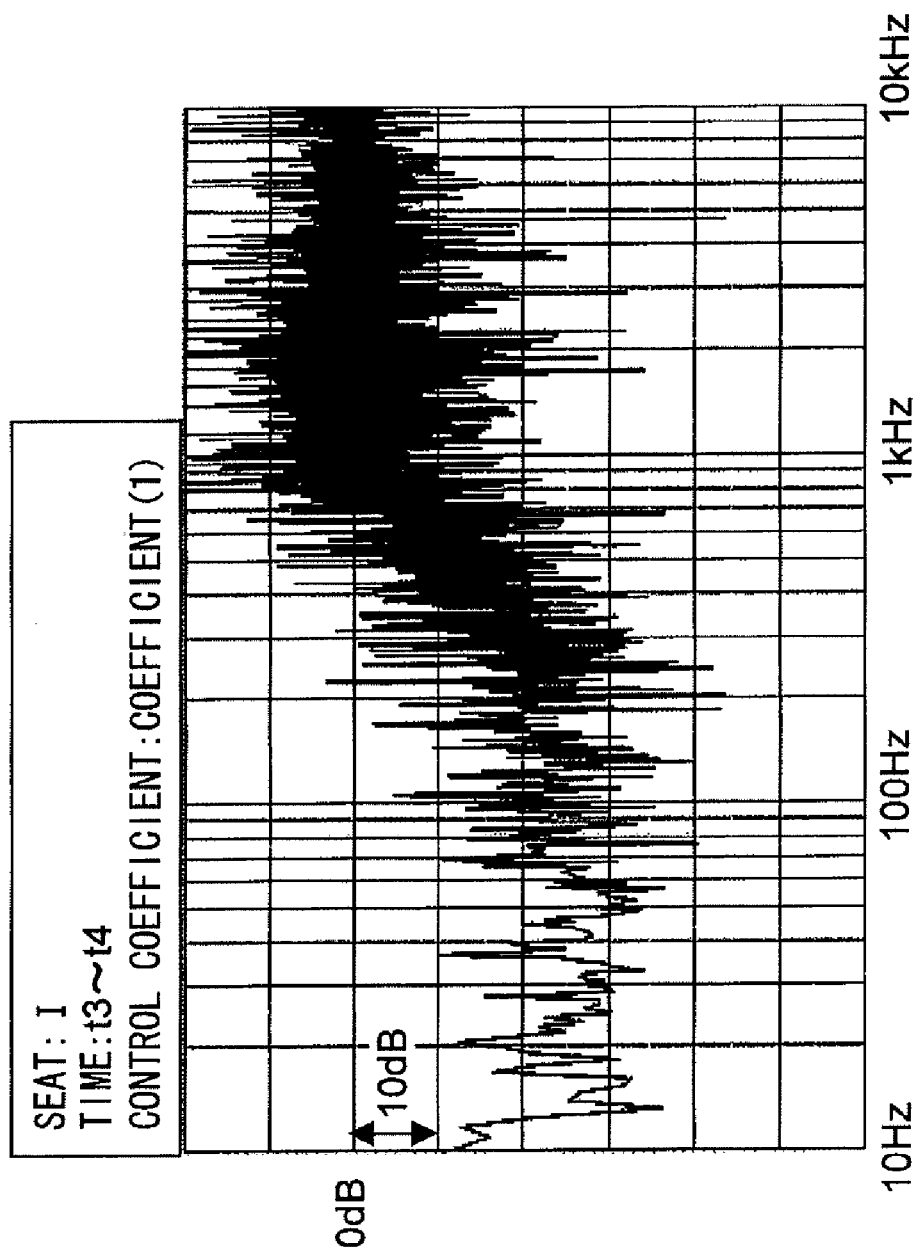
F I G. 7

F I G. 1 8

| ENGINE LOAD | 1 | 2 | 3 | 4 | 5 |
|---|---|---|---|---|---|
| FIXED FILTER 3101 | x1-1 | x1-2 | x1-3 | x1-4 | x1-5 |
| ...... | | | | | |
| FIXED FILTER 3120 | x20-1 | x20-2 | x20-3 | x20-4 | x20-5 |
| FIXED FILTER 1201-1 | y1-1 | y1-2 | y1-3 | y1-4 | y1-5 |
| ...... | | | | | |
| FIXED FILTER 1220-4 | y80-1 | y80-2 | y80-3 | y80-4 | y80-5 |

FIG. 23

| ENGINE LOAD | 1 | 2 | 3 | 4 | 5 |
|---|---|---|---|---|---|
| FIXED FILTER 1201-1 | y1-1 | y1-2 | y1-3 | y1-4 | y1-5 |
| ... | | | | | |
| FIXED FILTER 1220-4 | y80-1 | y80-2 | y80-3 | y80-4 | y80-5 |

NOISE CONTROL DEVICE

TECHNICAL FIELD

The present invention relates to a noise control device, and more particularly to a noise control device for actively reducing a noise arriving at a control point.

BACKGROUND ART

Recently, a noise control device has been proposed in which control (so-called active noise control) to reduce a noise arriving at a control point by reproducing a control sound which is in antiphase to the noise arriving at the control point is realized through selective operation of fixed filters and adaptive filters (for example, Patent Document 1).

Hereinafter, with reference to FIG. 27, the conventional noise control device mentioned above will be specifically described. FIG. 27 is a diagram illustrating a circuit structure of a conventional noise control device. In FIG. 27, the noise control device includes a noise microphone 9101, an adaptive filter 9201, a control speaker 9401, an error microphone 9501, and a fixed filter 9601.

The noise control device shown in FIG. 27 selects the adaptive filter 9201 to control a noise when the noise has changed due to a change of the position of the noise source and/or the generating state of the noise (for example, driving condition of a fan: the number of rotations). The noise microphone 9101 detects the noise arriving from the noise source, to output a noise signal to the adaptive filter 9201. The adaptive filter 9201 signal-processes the inputted noise signal by using a filter coefficient, to generate a control signal. The control signal generated at the adaptive filter 9201 is emitted as a control sound from the control speaker 9401 toward the control point. The error microphone 9501 is provided at the control point, and detects the noise arriving at the control point from the noise source and the control sound arriving at the control point from the control speaker 9401. At the error microphone 9501, the noise arriving at the control point interferes with the control sound from the control speaker 9401, and a difference therebetween is detected as an error signal. The adaptive filter 9201 has its filter coefficient updated to minimize the error signal. A specific method for this is, for example, the Filtered-X_LMS algorithm. Hereinafter, the update processing using the Filtered-X_LMS algorithm or the like will be referred to as coefficient update processing. In the coefficient update processing as mentioned above, when the noise has changed due to a change, for example, of the position of the noise source and/or the generating state of the noise, the adaptive filter 9201 is able to have its filter coefficient updated so as to generate an optimum control signal in accordance with the changed noise arriving at the control point.

Once the filter coefficients updated at the adaptive filter 9201 have converged, the noise control device shown in FIG. 27 selects the fixed filter 9601 having the coefficient value at which the filter coefficients have converged, as a fixed coefficient, thereby performing noise control.

Thus, the noise control device shown in FIG. 27 selectively operates the fixed filter and the adaptive filter to realize the active noise control.

PATENT DOCUMENT 1: Japanese Laid-open Patent Publication No. 2-285799

SUMMARY OF THE INVENTION

Problems to be Solved by the Invention

Here, when the control point is, for example, in the vicinity of an ear of a person who actually hears the noise, it is difficult to practically provide the error microphone 9501 at the control point. For this reason, the error microphone 9501 is not always provided at the control point. Accordingly, there are some occasions where the noise to be reduced by using the filter coefficient value at which the filter coefficients have converged at the adaptive filter 9201 may differ from the noise arriving at the control point. In such a case, there is a possibility that the control sound has in turn a bad influence, and the noise is increased as compared to a case where no control sound is reproduced (a case where the noise control is not performed).

Meanwhile, the noise control device shown in FIG. 27 performs noise control by selectively using the adaptive filter 9201. Accordingly, it is necessary to previously secure, in the noise control device shown in FIG. 27, a circuit scale for allowing the coefficient update processing, thus preventing the reduction of the circuit scale. Moreover, updating the filter coefficient of the adaptive filter 9201 requires a real time calculation of a filter coefficient, thus enhancing the requirements for a throughput. In addition, there is a possibility that use of a wrong filter coefficient will cause instant reproduction of a wrong control sound, and causes the noise to increase as compared to a case where no control sound is reproduced (a case where the noise control is not performed), thus making a user uncomfortable.

Therefore, an object of the present invention is to provide a noise control device in which a possibility, that a noise arriving at a control point is increased as compared to a case where the noise control is not performed, can be eliminated and the circuit scale thereof can be reduced.

Solution to the Problems

The present invention is made to solve the problems described above. A noise control device of the present invention is directed to a noise control device for reducing, by emitting a control sound toward a control point, a given noise arriving at the control point, and the noise control device comprises a controlling noise detector for detecting the given noise arriving to output a controlling noise signal; a controlling filter section for signal-processing the controlling noise signal outputted from the controlling noise detector, by using a fixed filter coefficient which is preset, to output a control signal; a control speaker for reducing the given noise arriving at the control point, by emitting toward the control point a control sound based on the control signal outputted from the controlling filter section; a noise determination section for determining whether or not the given noise arriving at the control point is a noise corresponding to the fixed filter coefficient; and an output control section for stopping output of the control signal from the controlling filter section when the noise determination section determines that the given noise is not a noise corresponding to the fixed filter coefficient.

Note that the output control section described above corresponds to, for example, an output control section 4000 in the embodiments to be described below.

The noise control device of the present invention stops the output of the control signal from the controlling filter section when the given noise arriving at the control point is not a noise corresponding to the fixed filter coefficient. Here, there is a possibility that in a case where the given noise arriving at the control point is not a noise corresponding to the fixed filter coefficient, a control sound may have a bad influence to cause the noise arriving at the control point to be increased as compared to a case where the noise control is not performed. In such a case, the output of the control signal from the controlling filter section is stopped to prevent output of the control sound. Accordingly, it is possible to eliminate the possibility that the noise is increased as compared to a case where the noise control is not performed. Further, in the noise control device of the present invention, the filter section performs noise control, without performing the coefficient update processing in which the Filtered-X_LMS algorithm or the like is used. This allows a reduction of a circuit scale as compared with a conventional noise control device using adaptive filters in which coefficient update processing is performed. Therefore, in the noise control device according to the present invention, the possibility that the noise arriving at the control point is increased as compared to a case where the noise control is not performed can be eliminated and the circuit scale thereof can be reduced.

Preferably, the noise determination section may include a determining noise detector for detecting the given noise arriving to output a determining noise signal; a determining filter section for signal-processing the controlling noise signal outputted from the controlling noise detector, using a fixed filter coefficient which is preset to reduce the determining noise signal outputted from the determining noise detector; an adder for adding the determining noise signal outputted from the determining noise detector and the controlling noise signal outputted from the determining filter section; and a level determination section for determining whether or not the given noise arriving at the control point is a noise corresponding to the fixed filter coefficient, by determining whether or not a level of an output signal from the adder is higher than a predetermined threshold, and the output control section may stop the output of the control signal from the controlling filter section, when the level determination section determines that the level of the output signal from the adder is higher than the predetermined threshold.

Note that the determining filter section corresponds to, for example, the fixed filters 3101 to 3120 in the embodiments to be described below.

Preferably, in this case, the noise determination section may further include a band extraction section for extracting only a signal in a predetermined frequency band from the output signal outputted from the adder, to output the signal to the level determination section.

Moreover, in this case, the predetermined threshold may include a first threshold and a second threshold having a level lower than the first threshold, the level determination section may determine whether or not the level of the output signal from the adder is higher than the first threshold, and whether or not the level of the output signal from the adder is higher than the second threshold, and the output control section may stop the output of the control signal from the controlling filter section when the level determination section determines that the level of the output signal from the adder is higher than the first threshold, and may start the output of the control signal from the controlling filter section when the level determination section determines that the level of the output signal from the adder is equal to or lower than the second threshold.

Moreover, in this case, there may be further provided a storage section for storing noise information which uniquely specifies a frequency and/or a level of the given noise arriving at the control point, and a filter coefficient to be set in the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing a filter coefficient set in the controlling filter section, into the read filter coefficient, when the level determination section determines that the level of the output signal from the adder is equal to or lower than the predetermined threshold.

Moreover, in this case, there may be further provided a storage section for storing noise information which uniquely specifies a frequency and/or a level of the given noise arriving at the control point, a filter coefficient to be set in the controlling filter section such that the control sound from the control speaker allows reduction of the given noise having the frequency and/or the level specified by the noise information, and a filter coefficient to be set in the determining filter section to reduce the determining noise signal outputted from the determining noise detector which has detected the given noise having the frequency and/or the level specified by the noise information, the noise information, the filter coefficient to be set in the controlling filter section, and the filter coefficient to be set in the determining filter section being associated with each other in the storage section; a determining change section for reading from the storage section the filter coefficient, which is to be set in the determining filter section and associated with the noise information inputted from outside, and changing a filter coefficient set in the determining filter section, into the read filter coefficient, when the level determination section determines that the level of the output signal from the adder is equal to or lower than the predetermined threshold; and a controlling change section for reading from the storage section the filter coefficient, which is to be set in the controlling filter section and associated with the noise information inputted from outside, and changing a filter coefficient set in the controlling filter section, into the read filter coefficient, when the level determination section determines that the level of the output signal from the adder is equal to or lower than the predetermined threshold after change processing performed by the determining change section.

Preferably, a plurality of the controlling noise detectors may be provided, the controlling filter section may be previously provided with a plurality of fixed filter coefficients associated with the plurality of the controlling noise detectors, respectively, and the controlling filter section may signal-process the controlling noise signal outputted from each of the plurality of the controlling noise detectors, using a corresponding one of the plurality of the fixed filter coefficients associated therewith, to output a control signal resulting from the signal-processing, the control speaker may reduce the given noise arriving at the control point, by emitting toward the control point the control sound based on the control signals from the controlling filter section, the noise determination section may include: a determining filter section for signal-processing, using a plurality of fixed filter coefficients which are preset to reduce a controlling noise signal from one of the plurality of the controlling noise detectors and to be associated with the others of the plurality of the controlling noise detectors, a controlling noise signal from each of the others of the plurality of the controlling noise detectors; an adder for adding the controlling noise signal from the one of the plurality of the controlling noise detectors and the controlling noise signals from the determining filter section; and a level determination section for determining whether or not the level of an output signal from the adder is higher than a predetermined threshold, and the output control section may stop the output of the control signals from the controlling filter section, when the level determination section determines that the level of the output signal from the adder is higher than the predetermined threshold.

Preferably, the noise determination section may determine whether or not the given noise arriving at the control point is a noise corresponding to the fixed filter coefficient, by receiving noise information which uniquely specifies a frequency and/or a level of the given noise arriving at the control point, and by determining, based on the noise information, whether or not the variation amount of the frequency and/or the level of the given noise arriving at the control point is larger than a predetermined amount, and the output control section may stop the output of the control signal from the controlling filter section when the noise determination section determines that the variation amount of the frequency and/or the level is larger than the predetermined amount.

In this case, there may be further provided a storage section for storing the noise information and a filter coefficient to be set in the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing a filter coefficient set in the controlling filter section, into the read filter coefficient, when the noise determination section determines that the variation amount of the frequency and/or the level is equal to or less than the predetermined amount.

Preferably, there may be further provided a filter coefficient calculation section for calculating a fixed filter coefficient for the controlling filter section; and a filter coefficient update section for updating, at a predetermined timing, a filter coefficient set in the controlling filter section, to the filter coefficient calculated by the filter coefficient calculation section.

Preferably, there may be further provided an error detector, provided at the control point, for detecting a combined signal generated by combining a noise and the control sound from the control speaker; a signal storage section for storing the controlling noise signal detected by the controlling noise detector and an error signal detected by the error detector; a filter coefficient calculation section for calculating the fixed filter coefficient for the controlling filter section, by using the noise signal and the error signal, both stored in the signal storage section; and a filter coefficient update section for updating, at a predetermined timing, a filter coefficient set in the controlling filter section, to the filter coefficient calculated at the filter coefficient calculation section.

In this case, there may be further provided an effect determination section for determining a signal level of the error signal detected by the error detector, and start of storing operation at the signal storage section and stop of operation at the controlling filter section may be controlled depending on determination at the effect determination section.

Moreover, in this case, the filter coefficient calculation section may include: an adaptive filter for signal-processing the controlling noise signal stored in the signal storage section; an acoustic filter for signal-processing an output from the adaptive filter; and an adder for adding an output signal from the acoustic filter and the error signal stored in the signal storage section, and a transfer function from the controlling speaker to the error detector may be set, as a coefficient, to the acoustic filter, and the adaptive filter may have its coefficient updated so as to minimize an addition result at the adder as a coefficient-updating error signal.

Effect of the Invention

According to the present invention, it is possible to provide a noise control device in which a possibility, that a noise arriving at a control point is increased as compared to a case where the noise control is not performed, can be eliminated and the circuit scale thereof can be reduced.

BRIEF DESCRIPTION OF THE DRAWINGS

FIG. 7 is a diagram illustrating error signal differences with a fixed coefficient (1) used, obtained under the condition that the seat 2000 represents a position of the seat I and the time is t3-t4.

FIG. 18 is a diagram illustrating a structure of data stored in a storage section 6100.

FIG. 23 is a diagram illustrating a structure of data stored in a storage section 6200.

Figure 1:
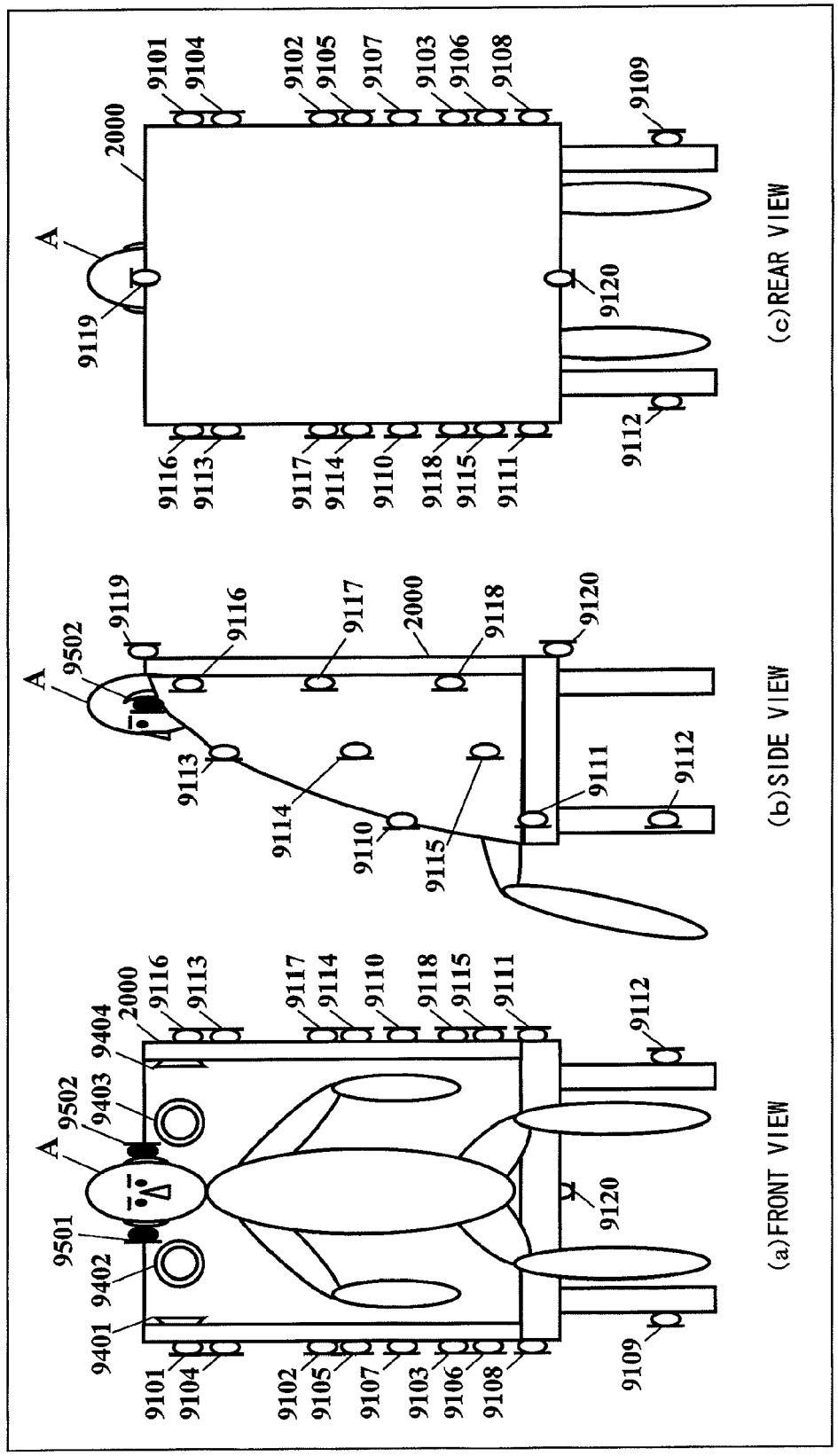
FIG. 1(a) is a front view.
FIG. 1(b) is a side view.
FIG. 1(c) is a rear view of an appearance of a crew member A sitting on a seat 2000 of an airplane.

DESCRIPTION OF THE REFERENCE CHARACTERS 1101 to 1120, 9101 to 9120 noise microphone
1000 controlling filter section
1401 to 1404, 9401 to 9404 control speaker
3000, 3500, 3600, 3700 noise determination section
3160, 4000 output control section
1201-1 to 1220-1, 1201-2 to 1220-2, 1201-3 to 1220-3, 1201-4 to 1220-4, 3101 to 3120, 9601 fixed filter
1301 to 1304, 3140, 7301 to 7304, 7501 to 7502, 9301 to 9304 adder
3130, 7601 to 7604, 9501 to 9502 error microphone
3150 bandpass filter
3170 level determination section
5100 determining change section
5200, 5300 controlling change section
5400 filter coefficient update section
6100, 6200 storage section
7000 filter coefficient calculation section
7001 signal storage section
7002 effect determination section
7401 to 7404 acoustic filter
7201-1 to 7220-1, 7201-2 to 7220-2, 9201-1 to 9220-1, 9201-2 to 9220-2, 9201-3 to 9220-3, 9201-4 to 9220-4 adaptive filter

BEST MODE FOR CARRYING OUT THE INVENTION

First, before describing embodiments according to the present invention, the basic concept of the present invention will be described.

Figure 2:
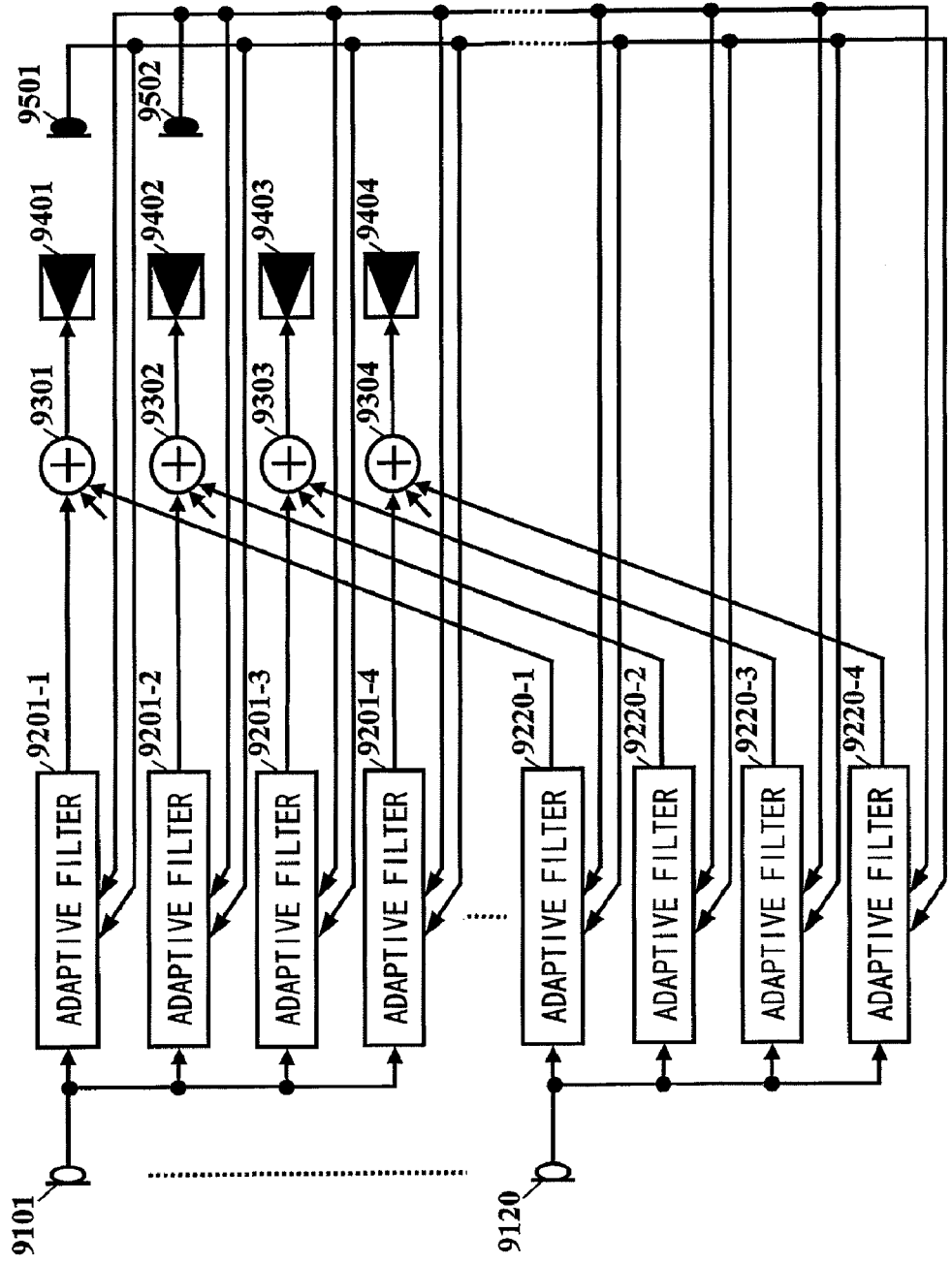
FIG. 2 is a diagram illustrating a circuit structure of a noise control device provided in the seat 2000 shown in FIG. 1.

When noise control using adaptive filters is performed in an airplane, for example, the structure shown in FIGS. 1(a)-(c) and FIG. 2 is used. FIG. 1(a) is a front view, FIG. 1(b) is a side view, and FIG. 1(c) is a rear view of an appearance of a crew member A sitting on a seat 2000 of an airplane. FIG. 2 is a diagram illustrating the circuit structure of a noise control device provided in the seat 2000 shown in FIGS. 1(a)-(c).

In FIG. 2, the noise control device includes noise microphones 9101 to 9120, adaptive filters 9201-1 to 9220-1, adaptive filters 9201-2 to 9220-2, adaptive filters 9201-3 to 9220-3, adaptive filters 9201-4 to 9220-4, adders 9301 to 9304, control speakers 9401 to 9404, and error microphones 9501 to 9502. As shown in FIGS. 1(a)-(c), the noise microphones 9101 to 9120 are provided on the outer sides of the seat 2000. The control speakers 9401 to 9404 are provided on the inner sides of the seat 2000, at the same heights as the ears of the crew member A. The control point is in the vicinity of the ears of the crew member A and it is assumed that the error microphones 9501 to 9502 are provided, for example, in the vicinity of the ears of the crew member A, each of which is the control point, although it is practically difficult.

The noise detected at the noise microphone 9101 is outputted as a noise signal to the adaptive filters 9201-1 to 9201-4. The noise detected at the noise microphone 9102 is outputted as a noise signal to the adaptive filters 9202-1 to 9202-4. In the same manner, the noises detected at the noise microphones 9103 to 9120 are outputted to adaptive filters 9203-"1" to "4" to 9220-"1" to "4, respectively.

A transfer function from the control speaker 9401 to the error microphone 9501 and a transfer function from the control speaker 9401 to the error microphone 9502, which are required in advance for the Filtered-X_LMS algorithm, are set to the adaptive filter 9201-1. The adaptive filter 9201-1 has its filter coefficient updated by using the respective transfer functions set thereto so as to minimize respective error signals from the error microphones 9501 and 9502 in total. In the same manner, the transfer function from the control speaker 9401 to the error microphone 9501 and the transfer function from the control speaker 9401 to the error microphone 9502 are set to the adaptive filter 9202-1. The adaptive filter 9202-1 has its filter coefficient updated by using the respective transfer functions set thereto so as to minimize respective error signals from the error microphones 9501 and 9502 in total. In the same manner, the transfer function from the control speaker 9401 to the error microphone 9501 and the transfer function from the control speaker 9401 to the error microphone 9502 are set to each of the adaptive filters 9203-1 to 9220-1. Each of the adaptive filters 9203-1 to 9220-1 has its filter coefficient updated by using the respective transfer functions set thereto so as to minimize respective error signals from the error microphones 9501 and 9502 in total.

Further, a transfer function from the control speaker 9402 to the error microphone 9501 and a transfer function from the control speaker 9402 to the error microphone 9502 are set to each of the adaptive filters 9201-2 to 9220-2. Each of the adaptive filters 9201-2 to 9220-2 has its filter coefficient updated by using the respective transfer functions set thereto so as to minimize respective error signals from the error microphones 9501 and 9502 in total. Further, a transfer function from the control speaker 9403 to the error microphone 9501 and a transfer function from the control speaker 9403 to the error microphone 9502 are set to each of the adaptive filters 9201-3 to 9220-3. Each of the adaptive filters 9201-3 to 9220-3 has its filter coefficient updated by using the respective transfer functions set thereto so as to minimize respective error signals from the error microphones 9501 and 9502 in total. Further, a transfer function from the control speaker 9404 to the error microphone 9501 and a transfer function from the control speaker 9404 to the error microphone 9502 are set to each of the adaptive filters 9201-4 to 9220-4. Each of the adaptive filters 9201-4 to 9220-4 has its filter coefficient updated by using the respective transfer functions set thereto so as to minimize respective error signals from the error microphones 9501 and 9502 in total.

Each of the adaptive filters 9201-1 to 9220-1 signal-processes the inputted noise signal by using the updated filter coefficient, and outputs the obtained signal to the adder 9301 as a control signal. The adder 9301 adds the control signals from the adaptive filters 9201-1 to 9220-1, and outputs the obtained signal to the control speaker 9401. The control speaker 9401 emits a control sound based on the control signal from the adder 9301, toward the error microphones 9501 and 9502, each of which is the control point. Each of the adaptive filters 9201-2 to 9220-2 signal-processes the inputted noise signal by using the updated filter coefficient, and outputs the obtained signal to the adder 9302 as a control signal. The adder 9302 adds the control signals from the adaptive filters 9201-2 to 9220-2, and outputs the obtained signal to the control speaker 9402. The control speaker 9402 emits a control sound based on the control signal from the adder 9302, toward the error microphones 9501 and 9502, each of which is the control point. Each of the adaptive filters 9201-3 to 9220-3 signal-processes the inputted noise signal by using the updated filter coefficient, and outputs the obtained signal to the adder 9303 as a control signal. The adder 9303 adds the control signals from the adaptive filters 9201-3 to 9220-3, and outputs the obtained signal to the control speaker 9403. The control speaker 9403 emits a control sound based on the control signal from the adder 9303, toward the error microphones 9501 and 9502, each of which is the control point. Each of the adaptive filters 9201-4 to 9220-4 signal-processes the inputted noise signal by using the updated filter coefficient, and outputs the obtained signal to the adder 9304 as a control signal. The adder 9304 adds the control signals from the adaptive filters 9201-4 to 9220-4, and outputs the obtained signal to the control speaker 9404. The control speaker 9404 emits a control sound based on the control signal from the adder 9304, toward the error microphones 9501 and 9502, each of which is the control point. In the coefficient update processing as described above, the noise control device shown in FIGS. 1(*a*)-(*c*) and FIG. 2 reduces the noise arriving at the vicinity of the ears of the crew member A, each of which is the control point.

Figure 3:
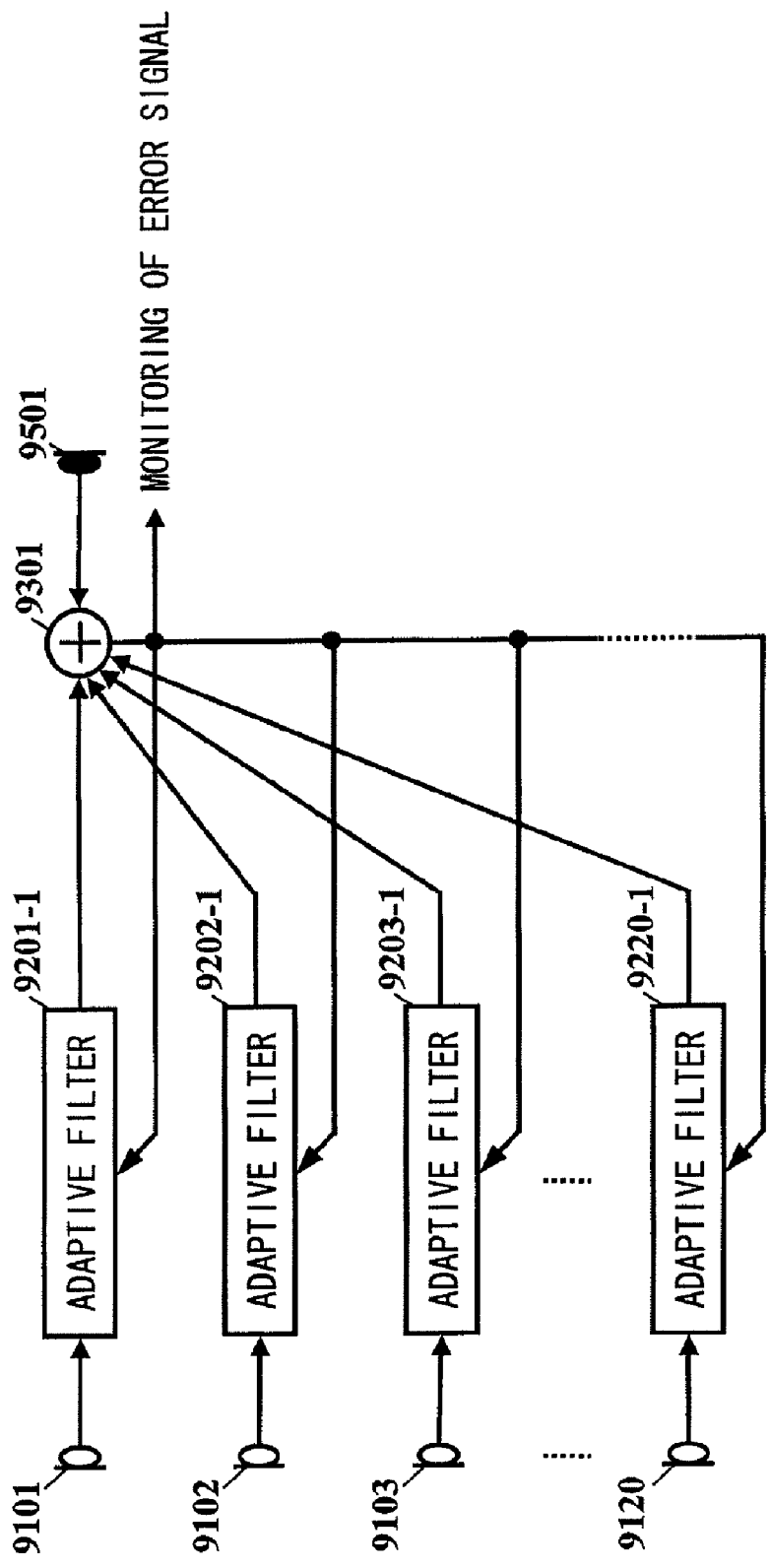
FIG. 3 is a diagram illustrating a circuit structure of a verification circuit.

Here, when the frequency and/or the level of the noise hardly vary or vary within a certain range of variation, noise control using only fixed filters as filters enables a similar noise reduction effect to that obtained by the noise control using adaptive filters. In order to verify this, a verification circuit shown in FIG. 3 is provided in the seat 2000 to observe the error signals under various conditions of the seat position and the time. FIG. 3 is a diagram illustrating a circuit structure of the verification circuit. Hereinafter, the verification circuit will be specifically described.

In FIG. 3, noise signals from the noise microphones 9101 to 9120 are signal-processed in the adaptive filter 9201-1 to 9220-1, respectively, to be added in the adder 9301. The noise detected at the error microphone 9501 is outputted to the adder 9301. The addition result at the adder 9301 is to be used as an error signal. Then, each of the adaptive filters 9201-1 to 9220-1 has its filter coefficient updated so as to minimize the error signal. Thus, the addition result at the adder 9301 is reduced. This means that the noise detected at the error microphone 9501 is reduced. Note that although in FIG. 2, the adaptive filters 9201-1 to 9220-1 each have its coefficient updated based on the Filtered-X_LMS algorithm, the adaptive filters 9201-1 to 9220-1 each have its coefficient updated based on a general LMS method in FIG. 3.

Hereinafter, the observed error signals will now be considered when the filter coefficients of the adaptive filters 9201-1 to 9220-1 have converged after the coefficient update processing under various conditions of the seat position and the time. Note that the following observation results are obtained when the airplane is flying at a cruising speed.

Figure 4:
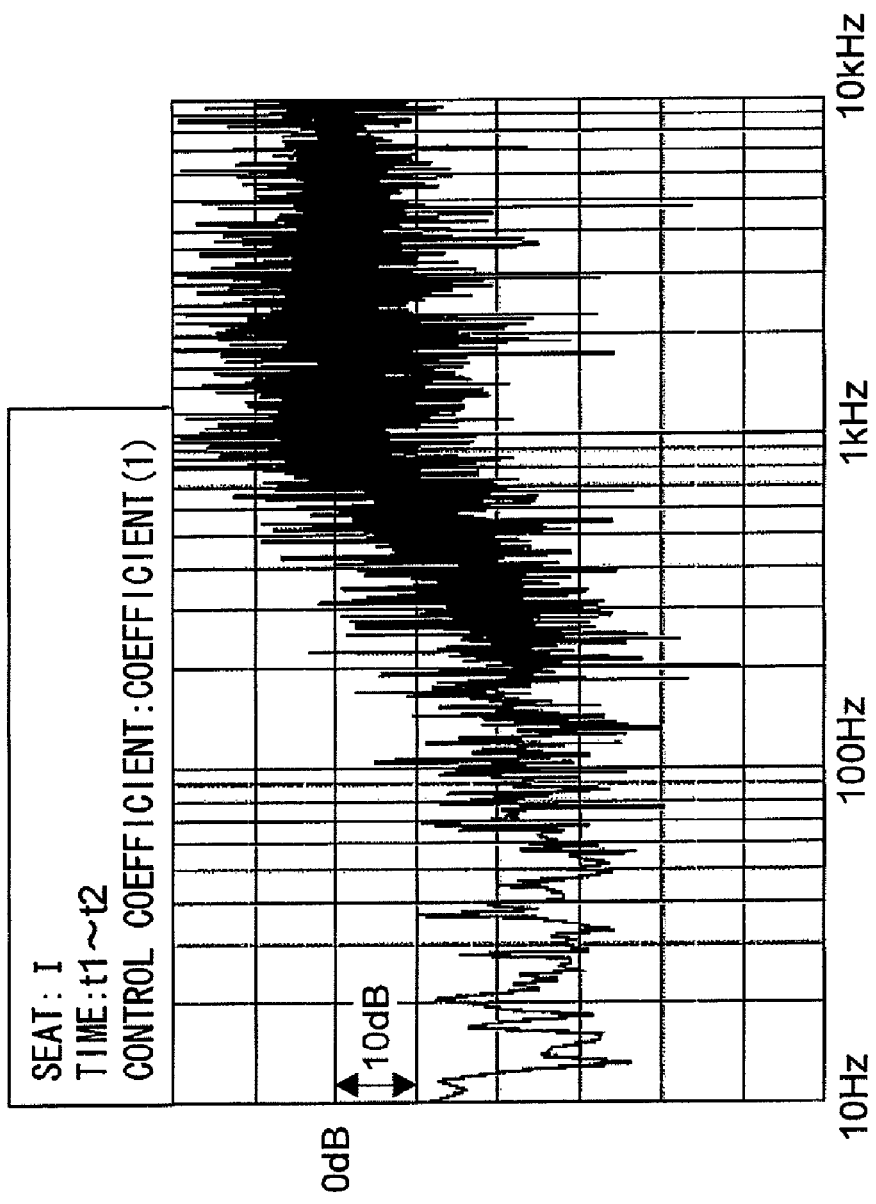
FIG. 4 is a diagram illustrating error signal differences obtained under the condition that the seat 2000 represents a position of the seat I and the time is t1-t2.
Figure 5:
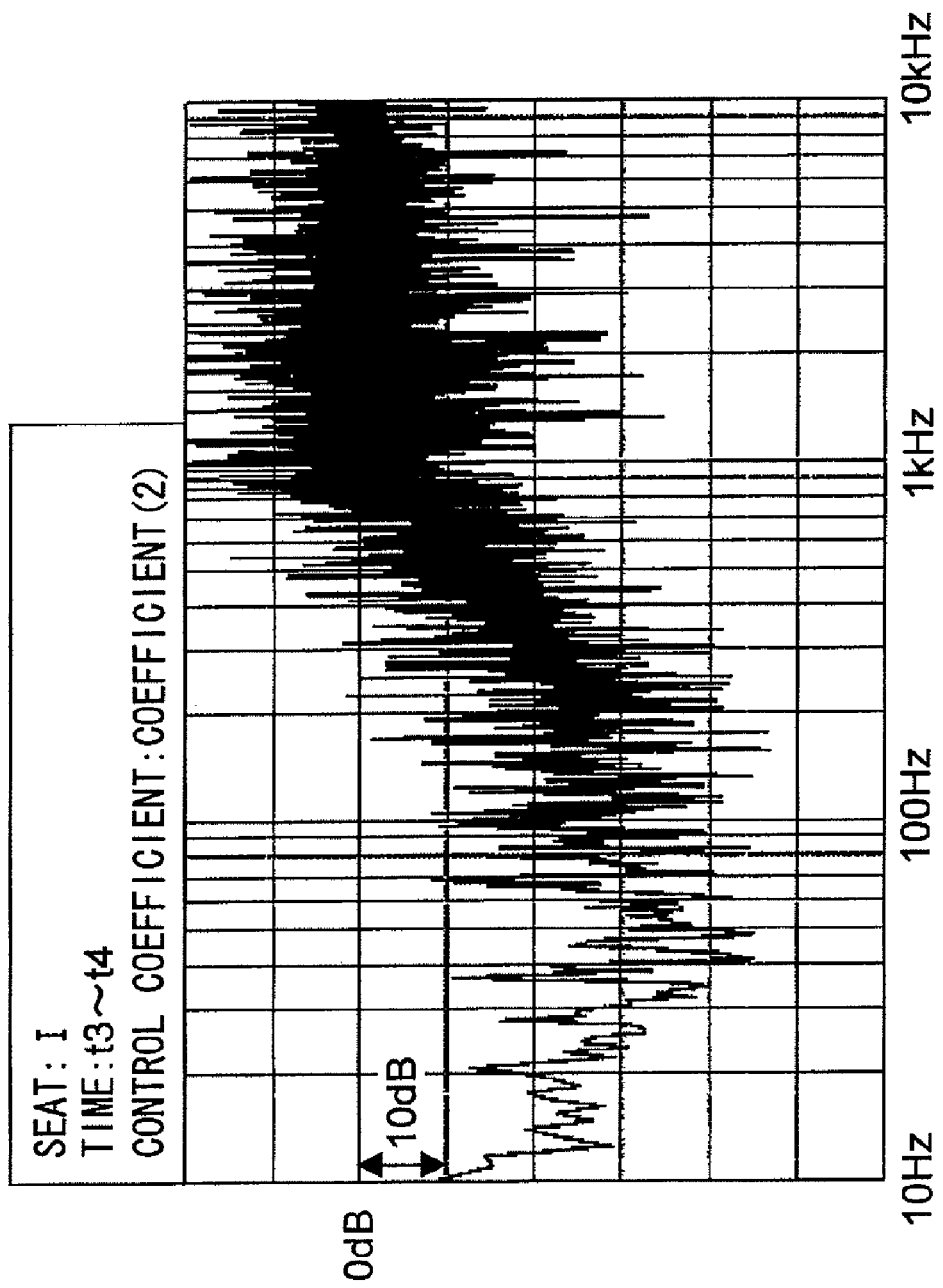
FIG. 5 is a diagram illustrating error signal differences obtained under the condition that the seat 2000 represents a position of the seat I and the time is t3-t4.
Figure 6:
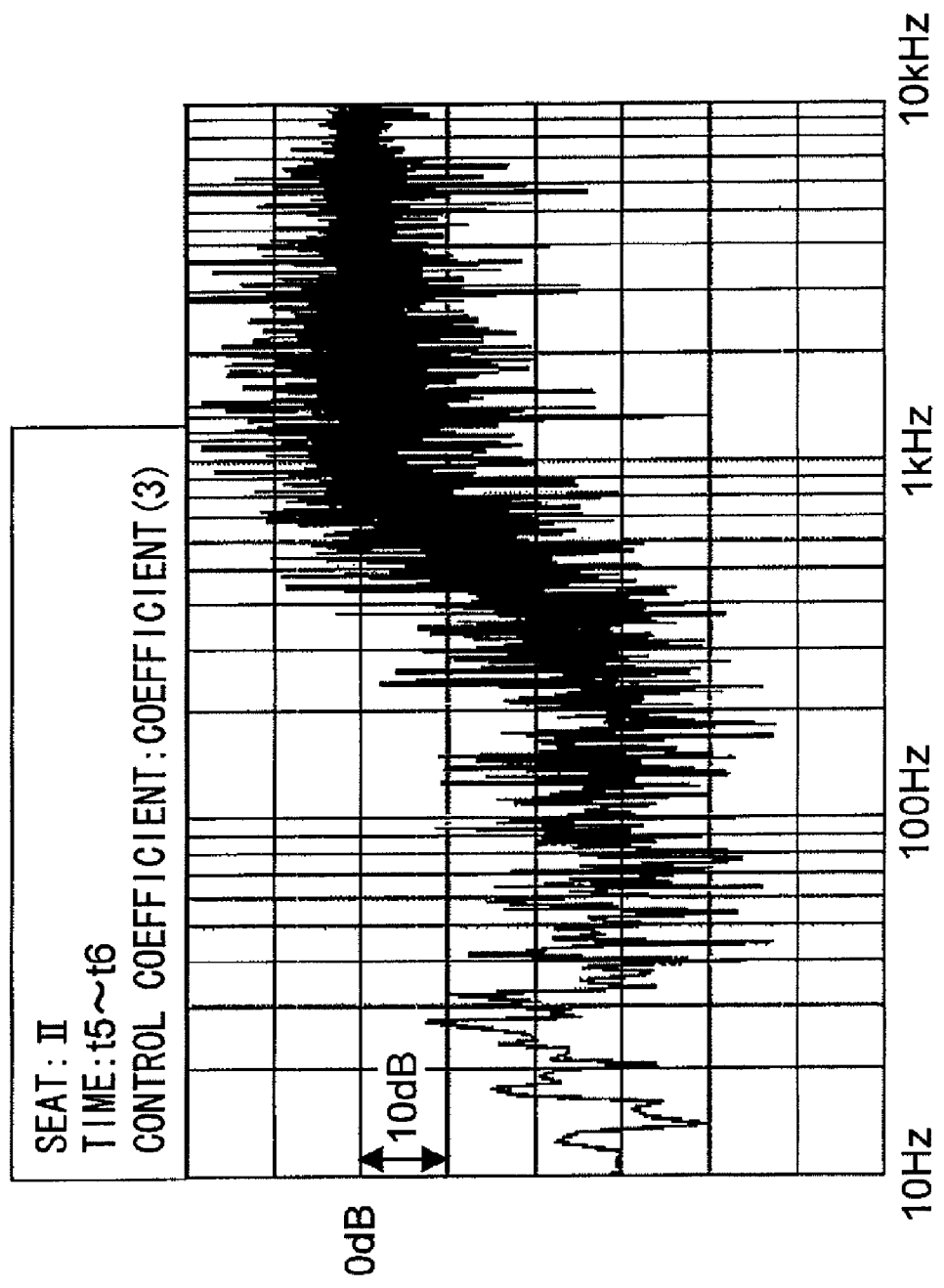
FIG. 6 is a diagram illustrating error signal differences obtained under the condition that the seat 2000 represents a position of the seat II and the time is t5-t6.

FIG. 4 is a diagram illustrating error signals obtained under the condition that the seat 2000 represents a position of the seat I and the time is t1-t2, and shows the error signal differences when the noise control is performed and when the noise control is not performed. That is, an error signal difference below the 0 dB line means a reduced noise. The seat I is a window seat in the front section of an airplane. In FIG. 4, the levels of error signal differences are lowered around 1 kHz or less, and are lowered by 10 dB or more, around 500 Hz or less. The group of filter coefficients which have converged at the adaptive filters 9201-1 to 9220-1 at this time is referred to as a coefficient (1). Further, FIG. 5 shows error signal differences obtained under the condition that the seat 2000 represents a position of the seat I and the time is t3-t4. In FIG. 5, as in FIG. 4, the levels of error signal differences are lowered around 1 kHz or less, and are lowered by 10 dB or more, around 500 Hz or less. The group of filter coefficients which have converged at the adaptive filters 9201-1 to 9220-1 at this time is referred to as a coefficient (2). Further, FIG. 6 shows error signal differences obtained under the condition that the seat 2000 represents a position of the seat II and the time is t5-t6. The seat II is a center seat in the front section of an airplane, and the seat I and the seat II both exist in a predetermined area of the front section of the airplane. In FIG. 6, as in FIG. 4, the levels of error signal differences are lowered around 1 kHz or less, and are lowered by 10 dB or more, around 500 Hz or less. The group of filter coefficients which have converged at the adaptive filters 9201-1 to 9220-1 at this time is referred to as a coefficient (3). Note that the time interval between t2 and t3, and the time interval between t4 and t5, are sufficiently long time periods (30 minutes or more), respectively.

Figure 8:
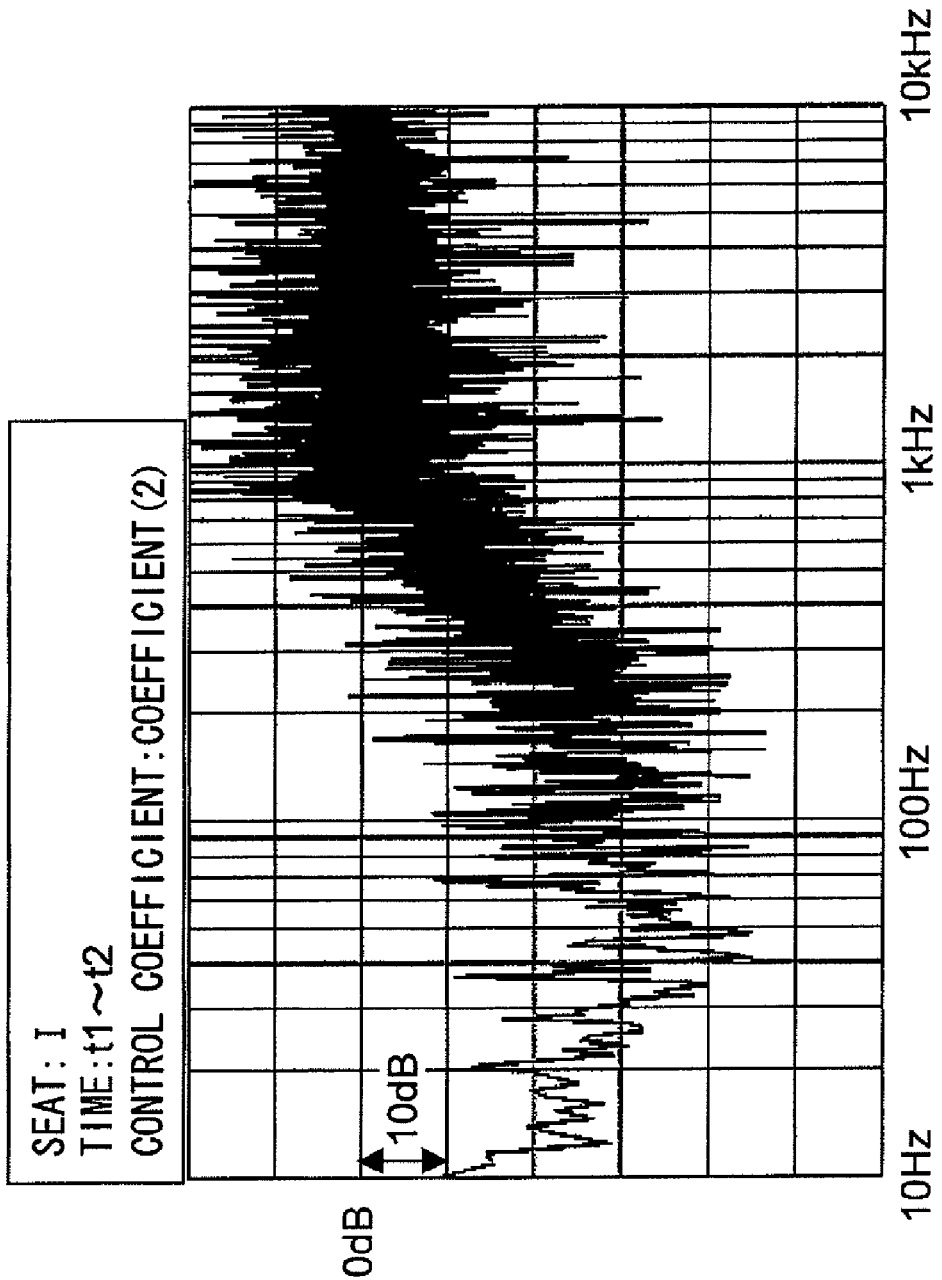
FIG. 8 is a diagram illustrating error signal differences with a fixed coefficient (2) used, obtained under the condition that the seat 2000 represents a position of the seat I and the time is t1-t2.
Figure 9:
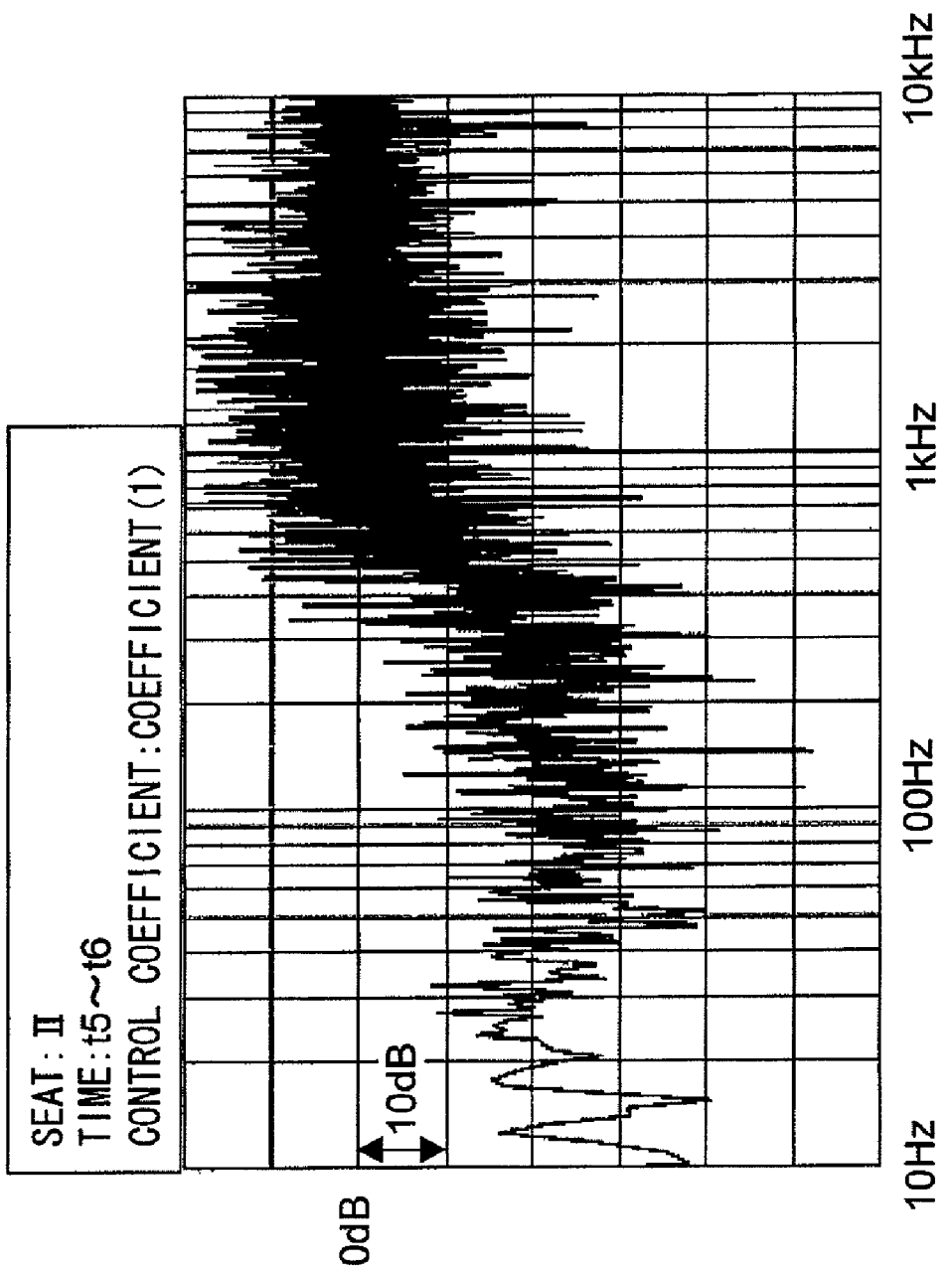
FIG. 9 is a diagram illustrating error signal differences with a fixed coefficient (1) used, obtained under the condition that the seat 2000 represents a position of the seat II and the time is t5-t6.

Here, FIG. 7 shows the error signal differences obtained when the coefficient update processing of the adaptive filters 9201-1 to 9220-1 is stopped and the adaptive filters 9201-1 to 9220-1 are each provided with the coefficient (1) as a fixed coefficient to operate as fixed filters, under the condition that the seat 2000 represents a position of the seat I and the time is t3-t4. In FIG. 7, a noise reduction effect similar to that shown in FIG. 5 using the coefficient (2) has been achieved with regard to the error signal difference. On the other hand, FIG. 8 shows the error signal differences obtained when the coefficient update processing of the adaptive filters 9201-1 to 9220-1 is stopped and the adaptive filters 9201-1 to 9220-1 are each provided with the coefficient (2) as a fixed coefficient to operate as fixed filters, under the condition that the seat 2000 represents a position of the seat I and the time is t1-t2. In FIG. 8, a noise reduction effect similar to that in FIG. 4 using the coefficient (1) has been achieved with regard to the error signal difference. Further, FIG. 9 shows the error signal differences obtained when the coefficient update processing of the adaptive filters 9201-1 to 9220-1 is stopped and the adaptive filters 9201-1 to 9220-1 are each provided with the coefficient (1) as a fixed coefficient to operate as fixed filters, under the condition that the seat 2000 represents a position of the seat II and the time is t5-t6. In FIG. 9, a noise reduction effect similar to that in FIG. 6 using the coefficient (3) has been achieved with regard to the error signal difference.

From the observations as described above, the following is considered. From the observations in FIG. 4 and FIG. 7 as well as those in FIG. 5 and FIG. 8, it is considered that at least when the same seat is used, the control using only fixed filters each provided with a fixed filter coefficient determined at a different time achieves a noise reduction effect equivalent to that achieved in the control using only adaptive filters in which coefficient update processing is always performed. In other words, it is considered that even when the frequency and/or the level of the noise vary within a certain range of variation as a function of time, a noise reduction effect equivalent to that achieved in the control using only adaptive filters in which coefficient update processing is always performed, can be achieved. Further, from the observations in FIG. 6 and FIG. 9, it is considered that within a predetermined area, the control using only fixed filters each provided with a fixed filter coefficient determined at a different place achieves a noise reduction effect equivalent to that achieved in the control using only adaptive filters in which coefficient update processing is always performed. In other words, it is considered that even when the frequency and/or the level of the noise vary within a certain range of variation depending on the place, a noise reduction effect equivalent to that achieved in the control using only adaptive filters in which coefficient update processing is always performed, can be achieved.

Thus, from the observations described above, it is known that even when the frequency and/or the level of the noise vary within a certain range of variation, as happens in a predetermined area in an airplane flying at a cruising speed, noise control using only fixed filters each provided with a fixed filter coefficient determined based on the noise achieves a noise reduction effect equivalent to that achieved in the noise control using adaptive filters. However, when the variation amount of the frequency and/or the level of the noise is too large, the noise arriving at the control point may increase as compared to a case where the noise control is not performed. In consideration of this, in the present invention, the amount of the noise to be reduced is estimated from the observations as described above and a value representing a variation amount, equal to or less than the variation amount of the frequency and/or the level of the noise obtained when the noise arriving at the control point increases as compared to a case where the noise control is not performed, is set as a threshold (predetermined amount). Thus, when the variation amount is equal to or less than the threshold, it is considered that the noise arriving at the control point is a noise corresponding to the filter coefficients of the fixed filters, that is, the noise is stable, and then a control sound is outputted. On the other hand, it is considered that when the variation amount is larger than the threshold, the noise arriving at the control point is not a noise corresponding to the filter coefficients of the fixed filters, that is, the noise is unstable, and then a control sound is not outputted. In this manner, a possibility that a noise arriving at the control point may increase as compared to a case where the noise control is not performed can be eliminated, while any threshold may be set. Moreover, according to the present invention, filters to be used are only fixed filters, and thus it is possible to reduce the circuit scale, as compared with a conventional noise control device using adaptive filters in which coefficient update processing is performed.

Hereinafter, a noise control device for realizing the basic concept as described above will be described in detail, with reference to specific examples of the structures according to the first to fourth embodiments.

First Embodiment

Figure 10:
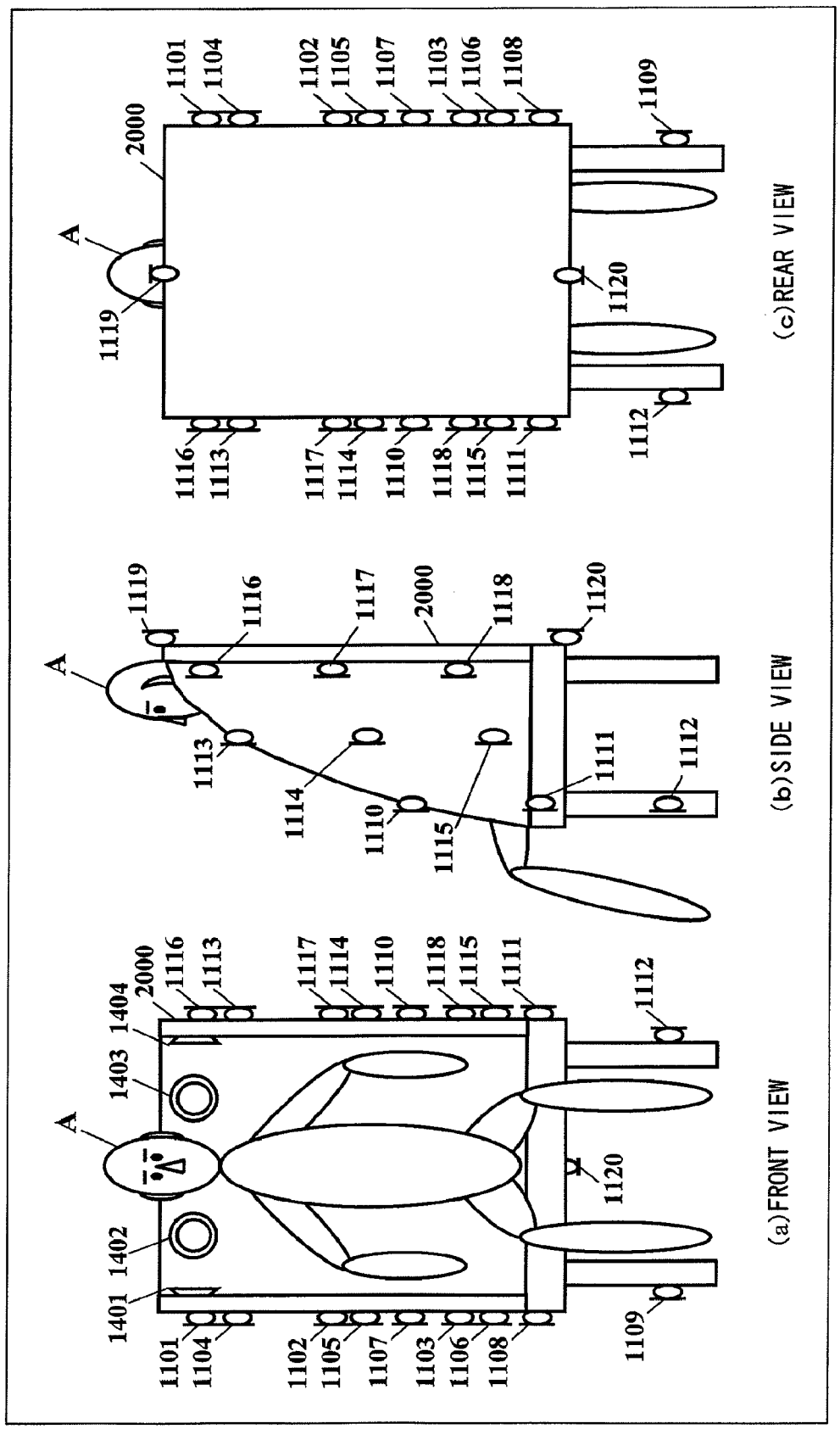
FIG. 10(a) is a front view.
FIG. 10(b) is a side view.
FIG. 10(c) is a rear view of an appearance of a crew member A sitting on the seat 2000 of an airplane.
Figure 11:
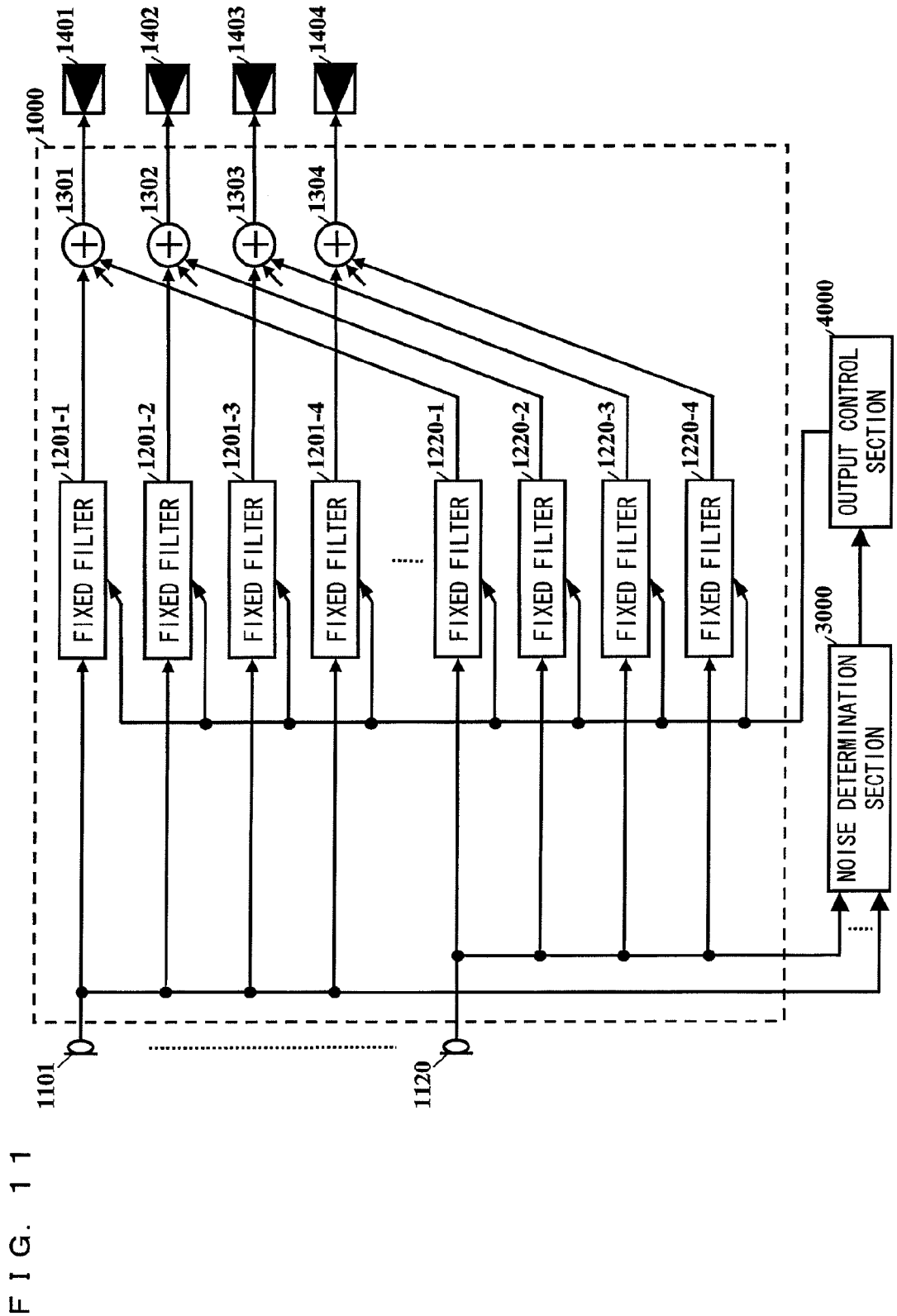
FIG. 11 is a diagram illustrating a circuit structure of a noise control device provided in the seat 2000 shown in FIG. 10 according to the first embodiment.

With reference to FIGS. 10(*a*)-(*c*) and FIG. 11, a circuit structure of a noise control device according to a first embodiment of the present invention will be described. FIG. 10(*a*) is a front view, FIG. 10(*b*) is a side view, and FIG. 10(*c*) is a rear view of an appearance of a crew member A sitting on a seat 2000 of an airplane. FIG. 11 is a diagram illustrating a circuit structure of a noise control device, provided in the seat 2000 shown in FIGS. 10(*a*)-(*c*) according to the first embodiment.

In FIG. 11, the noise control device includes noise microphones 1101 to 1120, a controlling filter section 1000, control speakers 1401 to 1404, a noise determination section 3000, and an output control section 4000. As shown in FIG. 10, the noise microphones 1101 to 1120 are controlling noise detectors for detecting the noise to be used in the noise control, and are provided in the outer sides of the seat 2000. Each of the noise microphones 1101 to 1120 detects the arriving noise to output a controlling noise signal to the controlling filter section 1000. The control speakers 1401 to 1404 are provided on the inner sides of the seat 2000, at the same height as the ears of the crew member A. The control point is in the vicinity of the ears of the crew member A. The control speakers 1401 to 1404 receive the control signals generated at the controlling filter section 1000, and emit control sounds toward the control point, respectively.

The controlling filter section 1000 includes fixed filters 1201-1 to 1220-1, fixed filters 1201-2 to 1220-2, fixed filters 1201-3 to 1220-3, fixed filters 1201-4 to 1220-4, and adders 1301 to 1304.

The noise detected at the noise microphone 1101 is outputted as a controlling noise signal to the fixed filters 1201-1 to 1201-4. The noise detected at the noise microphone 1102 is outputted as a controlling noise signal to the fixed filters 1202-1 to 1202-4. In the same manner, the noises detected at the noise microphones 1103 to 1120 are outputted to fixed filters 1203-"1" to "4" to 1220-"1" to "4", respectively.

The fixed filter 1201-1 signal-processes the controlling noise signal outputted from the noise microphone 1110, using a preset fixed filter coefficient, and outputs the obtained signal to the adder 1301 as a control signal. The filter coefficient set at the fixed filter 1201-1 is determined such that when a control sound based on the control signal to be generated is outputted from the control speaker 1401, the phase of the control sound will be in the antiphase at the control point to the phase of the given noise arriving at the control point. Here, the given noise is a noise generated in an airplane flying at a cruising speed, and the filter coefficient set at each of the fixed filters 1201-1 to 1220-4 is determined when the frequency and/or the level of the given noise arriving at the control point are varying within a certain range of variation. The fixed filter 1202-1 signal-processes the controlling noise signal outputted from the noise microphone 1102, using a preset fixed filter coefficient, and outputs the obtained signal to the adder 1301 as a control signal. The filter coefficient set at the fixed filter 1202-1 is determined such that when a control sound based on the control signal to be generated is outputted from the control speaker 1401, the phase of the control sound will be in the antiphase at the control point to the phase of the given noise arriving at the control point. In the same manner, each of the fixed filters 1203-1 to 1220-1 signal-processes the controlling noise signal outputted from a corresponding one of the noise microphones 1103 to 1120, using a preset fixed filter coefficient, and outputs the obtained signal to the adder 1301 as a control signal. The filter coefficient set at each of the fixed filters 1203-1 to 1220-1 is determined such that when a control sound based on the control signal to be generated is outputted from the control speaker 1401, the phase of the control sound will be in the antiphase at the control point to the phase of the given noise arriving at the control point. The adder 1301 adds the control signals outputted from the fixed filters 1201-1 to 1220-1, and outputs the obtained signal to the control speaker 1401. The control speaker 1401 emits a control sound based on the control signal outputted from the adder 1301, toward the control point.

Further, each of the fixed filters 1201-2 to 1220-2 signal-processes the controlling noise signal from a corresponding one of the noise microphone 1101 to 1120, using a preset fixed filter coefficient, and outputs the obtained signal to the adder 1302 as a control signal. The filter coefficient set at each of the fixed filters 1201-2 to 1220-2 is determined such that when a control sound based on the control signal to be generated is outputted from the control speaker 1402, the phase of the control sound will be in the antiphase at the control point to the phase of the given noise arriving at the control point. The adder 1302 adds the control signals outputted from the fixed filters 1201-2 to 1220-2, and outputs the obtained signal to the control speaker 1402. The control speaker 1402 emits a control sound based on the control signal outputted from the adder 1302, toward the control point.

Further, each of the fixed filters 1201-3 to 1220-3 signal-processes the controlling noise signal from a corresponding one of the noise microphones 1101 to 1120, using a preset fixed filter coefficient, and outputs the obtained signal to the adder 1303 as a control signal. The filter coefficient set at each of the fixed filters 1201-3 to 1220-3 is determined such that when a control sound based on the control signal to be generated is outputted from the control speaker 1403, the phase of the control sound will be in the antiphase at the control point to the phase of the given noise arriving at the control point. The adder 1303 adds the control signals outputted from the fixed filters 1201-3 to 1220-3, and outputs the obtained signal to the control speaker 1403. The control speaker 1403 emits a control sound based on the control signal outputted from the adder 1303, toward the control point.

Further, each of the fixed filters 1201-4 to 1220-4 signal-processes the controlling noise signal from a corresponding one of the noise microphones 1101 to 1120, using a preset fixed filter coefficient, and outputs the obtained signal to the adder 1304 as a control signal. The filter coefficient set at each of the fixed filters 1201-4 to 1220-4 is determined such that when a control sound based on the control signal to be generated is outputted from the control speaker 1404, the phase of the control sound will be in the antiphase at the control point to the phase of the given noise arriving at the control point. The adder 1304 adds the control signals outputted from the fixed filters 1201-4 to 1220-4, and outputs the obtained signal to the control speaker 1404. The control speaker 1404 emits a control sound based on the control signal outputted from the adder 1304, toward the control point.

Thus, in the processing performed by the controlling filter section 1000 as described above, the noise control device shown in FIG. 10 and FIG. 11 is able to reduce the given noise arriving at the vicinity of the ears of a crew member A, each of which is a control point.

The noise determination section 3000 determines whether or not the variation amount of the frequency and/or the level of the given noise arriving at the control point is larger than a predetermined amount. When the variation amount is equal to or less than the predetermined amount, the noise determination section 3000 determines that the given noise is stable, and outputs, to the output control section 4000, an output start signal for starting the output from each of the fixed filters 1201-1 to 1220-4. When it is determined that the variation amount is larger than the predetermined amount, the noise determination section 3000 determines that the given noise has become unstable, and outputs, to the output control section 4000, an output stop signal for stopping the output of the control signal from each of the fixed filters 1201-1 to 1220-4.

Figure 12:
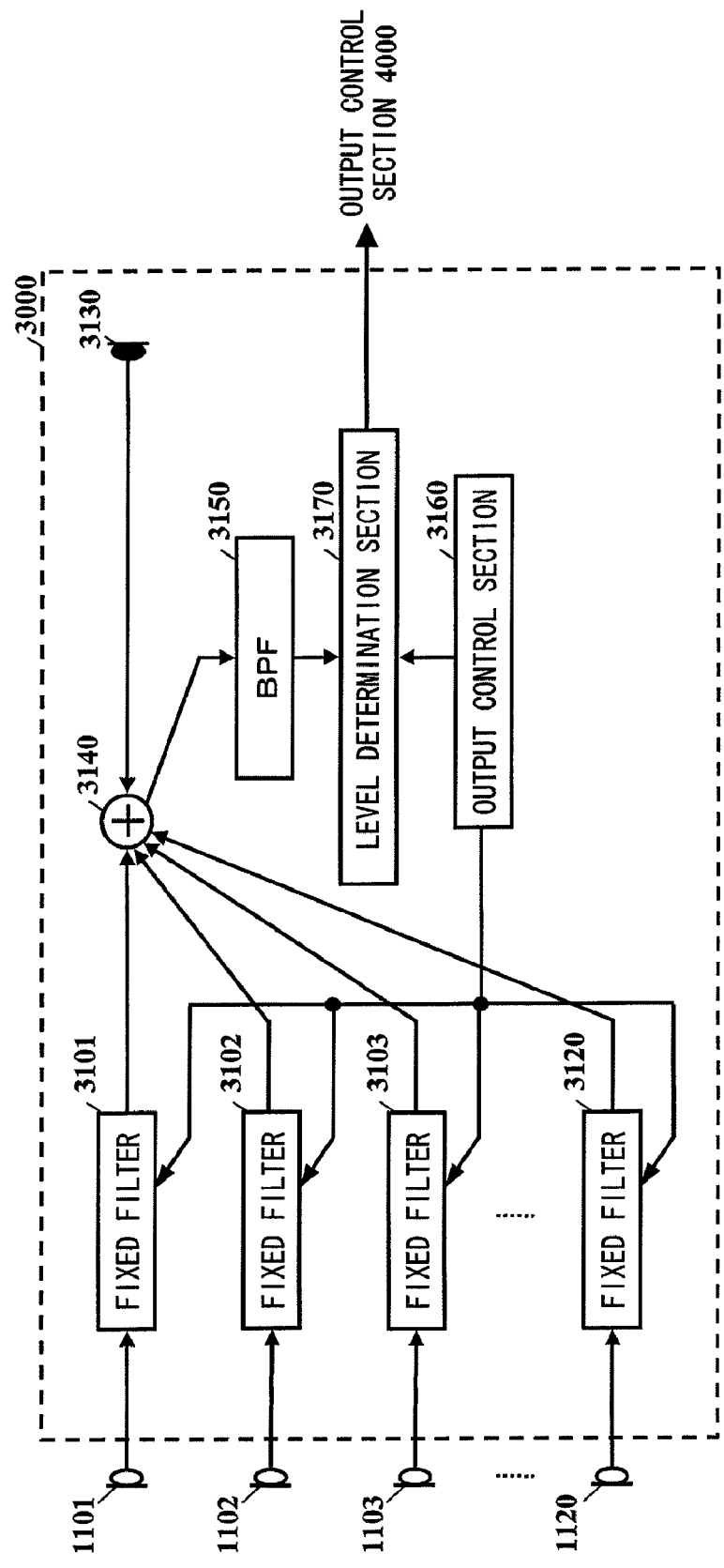
FIG. 12 is a diagram illustrating a specific circuit structure of a noise determination section 3000.

Hereinafter, with reference to FIG. 12, a specific circuit structure of the noise determination section 3000 will be described. FIG. 12 is a diagram illustrating a specific circuit structure of the noise determination section 3000. In FIG. 12, the noise determination section 3000 includes fixed filters 3101 to 3120, a determining error microphone 3130, an adder 3140, a bandpass filter (BPF) 3150, an output control section 3160, and a level determination section 3170.

The fixed filter 3101 signal-processes a controlling noise signal outputted from the noise microphone 1101, using a preset fixed filter coefficient, and outputs the obtained signal to the adder 3140 as a control signal. The filter coefficient set at the fixed filter 3101 is predetermined based on the given noise so as to minimize the output from the adder 3140 described below. In the same manner, each of the fixed filters 3103 to 3120 signal-processes a controlling noise signal from a corresponding one of the noise microphones 1103 to 1120, using a preset fixed filter coefficient, and outputs the obtained signal to the adder 3140 as a control signal. The filter coefficient set at each of the fixed filters 3103 to 3120 is predetermined based on the given noise so as to minimize the output from the adder 3140 described below. Here, by way of example, as the group of the filter coefficients set at the fixed filters 3101 to 3120, the coefficient (1) described with reference to FIG. 3 and FIG. 4 is used.

The determining error microphone 3130 is a determining noise detector. The determining error microphone 3130 may not be provided at the control point like the error microphone 9501 shown in FIG. 3, and may be provided in a position which avoids any inconvenience to the crew member A, such as in the lower surface of or on the back of the seat 2000. The determining error microphone 3130 detects the arriving noise to output a determining noise signal to the adder 3140.

Note that when the noise control device of the present invention is provided as hardware below the seat 2000, the determining error microphone 3130 may be provided inside the noise control device of the present invention or on a housing of the noise control device of the present invention. Further, a new microphone may not necessarily be prepared as the determining error microphone 3130, and any one of the noise microphones 1101 to 1120 may be used as such. For example, in a case where the noise microphone 1120 shown in FIG. 12 is used as the determining error microphone 3130, the noise microphones for inputting the controlling noise signals, respectively, to the noise determination section 3000 are the noise microphones 1101 to 1119, and thus the noise determination section 3000 has the fixed filters 3101-3119. As described above, in a case where any one of the noise microphones 1101 to 1120 is used as the determining error microphone 3130, the number of the fixed filters in the noise determination section 3000 is reduced by one, thereby reducing the amount of computation by the amount of computation corresponding to the unused filter.

The adder 3140 adds the control signals outputted from the fixed filters 3101 to 3120 and the determining noise signal outputted from the determining error microphone 3130, and outputs the obtained signal to the BPF 3150. The frequency characteristic of the output signal from the adder 3140 is as shown in FIG. 4, for example.

The BPF 3150 extracts only a signal in a predetermined frequency band, from the output signal outputted from the adder 3140. That is, the BPF 3150 removes a signal in unnecessary frequency band of the output signal outputted from the adder 3140. The predetermined frequency band may be, for example, 20-500 Hz in consideration of the result as shown in FIG. 4.

The output control section 3160 controls the operation of the fixed filters 3101 to 3120, and controls whether or not each of the fixed filters 3101 to 3120 stops or starts the output of a control signal. When the output control section 3160 stops the operations of the fixed filters 3101 to 3120, to stop the outputs of the control signals therefrom, the output control section 3160 outputs, to the level determination section 3170, a non-operation signal which indicates that the fixed filters 3101 to 3120 are not operating. On the other hand, when the output control section 3160 starts the operations of the fixed filters 3101 to 3120, to start the outputs of the control signals therefrom, the output control section 3160 outputs, to the level determination section 3170, an operation signal which indicates that the fixed filters 3101-3120 are operating.

Figure 13:
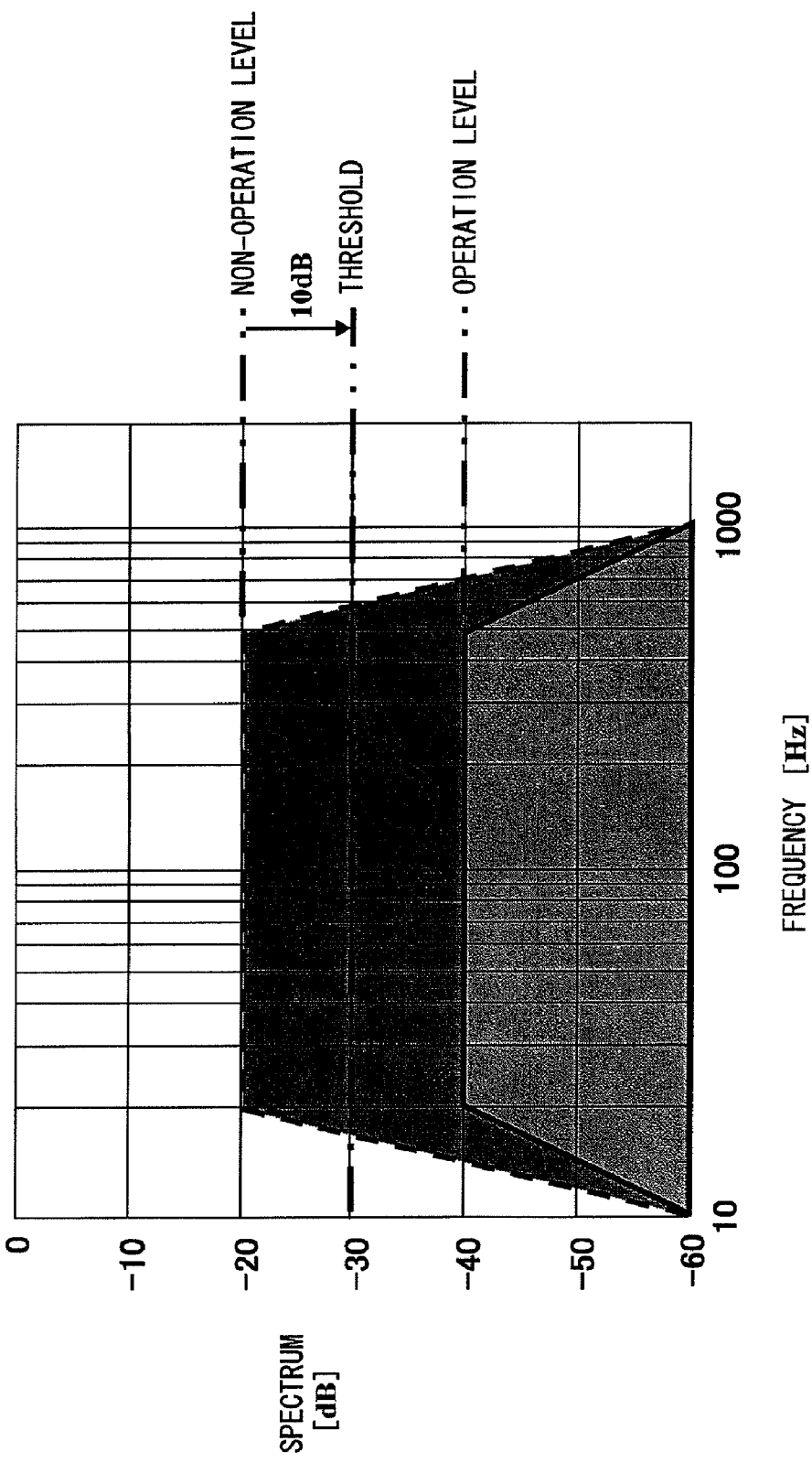
FIG. 13 is a diagram illustrating a threshold which is a criterion used by a level determination section 3170.

Upon receiving the non-operation signal from the output control section 3160, the level determination section 3170 calculates the level of the output signal from the BPF 3150 as a non-operation level. Then, the level determination section 3170 determines a threshold based on the calculated non-operation level, and stores the determined threshold therein. This threshold corresponds to a threshold (predetermined amount) related to the variation amount of the frequency and/or the level of the given noise arriving at the control point. To be specific, for example, the level determination section 3170 sets, as a threshold, a level which is 10 dB lower than the non-operation level as shown in FIG. 13. FIG. 13 is a diagram illustrating the threshold which serves as a criterion used by the level determination section 3170. Afterwards, upon receiving the operation signal from the output control section 3160, the level determination section 3170 calculates the level of the output signal from the BPF 3150 as an operation level. Then, the level determination section 3170 determines whether or not the calculated operation level is higher than the threshold stored therein. When the level determination section 3170 determines that the operation level is higher than the threshold, the level determination section 3170 determines that "the given noise has become unstable", and outputs an output stop signal to the output control section 4000. On the other hand, when the level determination section 3170 determines that the operation level is equal to or lower than the threshold, the level determination section 3170 determines that "the given noise is stable", and outputs an output start signal to the output control section 4000. Note that the level of the output signal calculated by the level determination section 3170 is, for example, an overall level of the output signal.

Upon receiving the output stop signal from the noise determination section 3000, the output control section 4000 stops the operations of the fixed filters (1201-1 to 1220-1, 1201-2 to 1220-2, 1201-3 to 1220-3, 1201-4 to 1220-4) in the controlling filter section 1000, to stop the outputs of the control signals therefrom. On the other hand, upon receiving the output start signal from the noise determination section 3000, the output control section 4000 starts the operations of the fixed filters in the controlling filter section 1000, to start the outputs of control signals therefrom.

Figure 14:
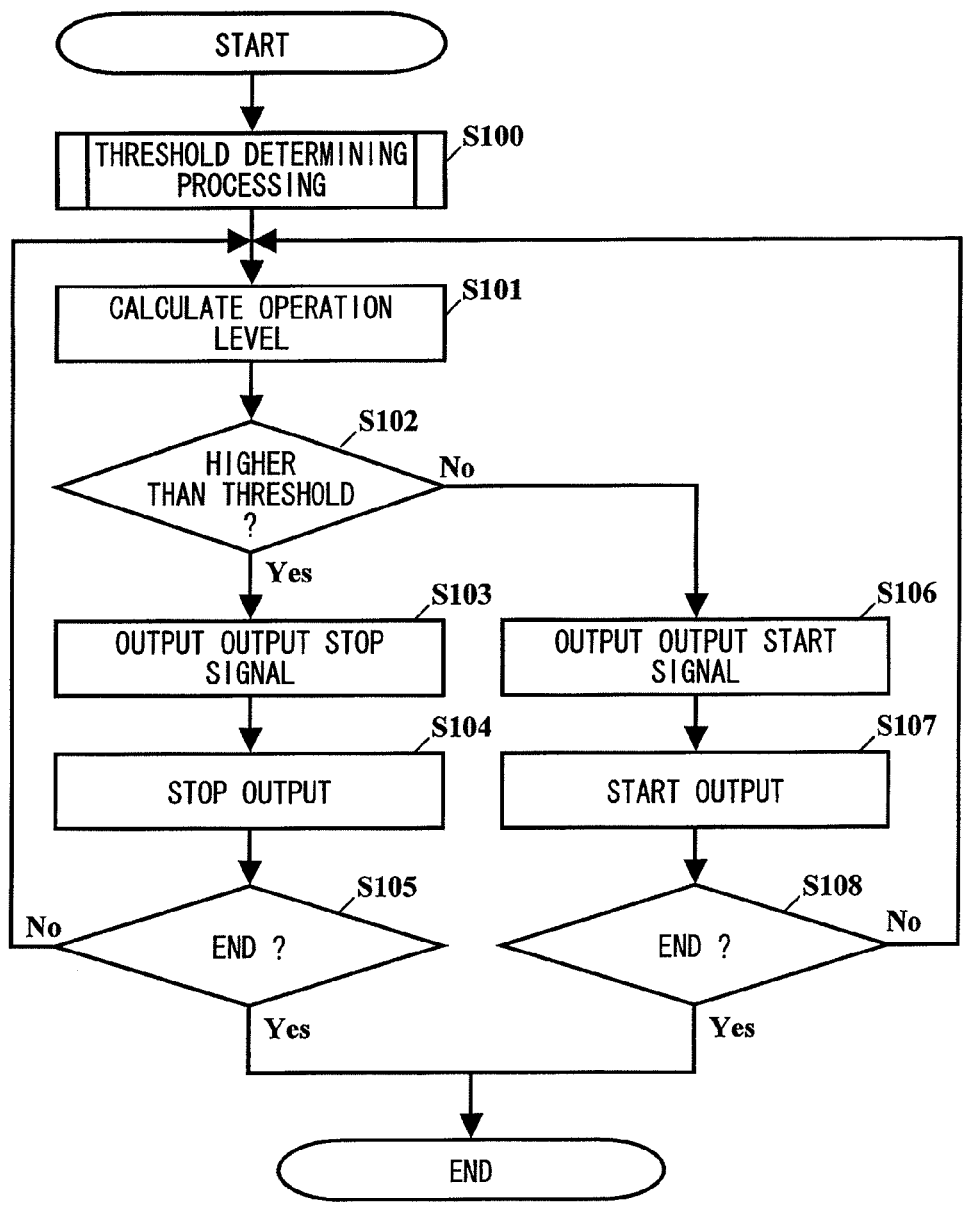
FIG. 14 is a flow chart showing a flow of noise determination processing and output control processing according to the first embodiment.

Hereinafter, with reference to FIG. 14, a flow of the noise determination processing and the output control processing according to the first embodiment will be described. FIG. 14 is a flow chart showing the flow of the noise determination processing and the output control processing according to the first embodiment. The following processing is performed when all the fixed filters in the controlling filter section 1000 and in the noise determination section 3000 are operating. Moreover, in the initial state of the noise determination section 3000, the frequency and/or the level of the given noise are varying within a certain range of variation.

Figure 15:
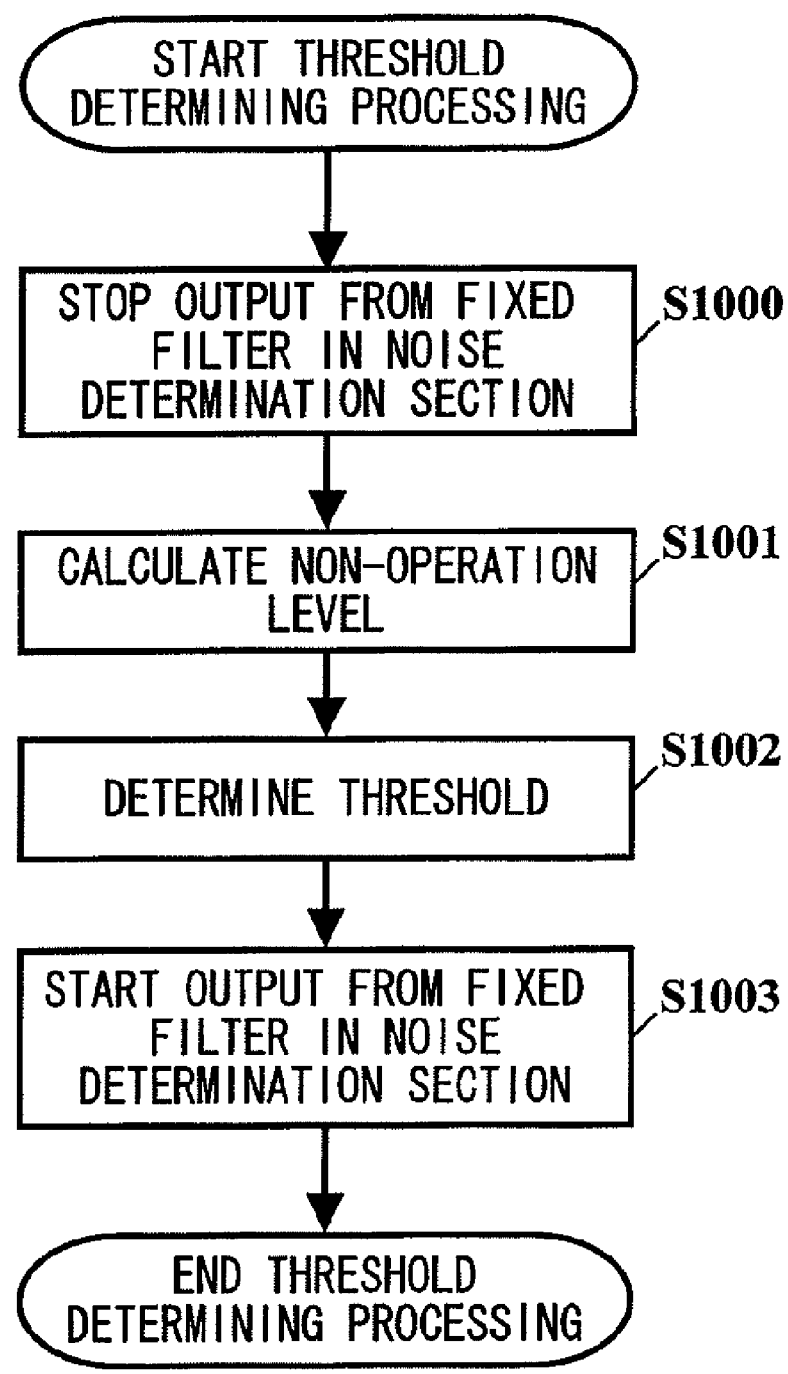
FIG. 15 is a flow chart showing in detail a processing flow in step S100.

In FIG. 14, once the processing is started, processing for determining a threshold is performed in the initial state of the noise determination section 3000 (step S100). FIG. 15 is a flow chart showing in detail a processing flow in step S100. In FIG. 15, the output control section 3160 stops the operations of the fixed filters in the noise determination section 3000, to stop the outputs of control signals therefrom, and outputs a non-operation signal to the level determination section 3170 (step S1000). Following step S1000, the level determination section 3170 calculates, based on the non-operation signal, the level of the output signal from the BPF 3150 as a non-operation level (step S1001). The level determination section 3170 sets, as a threshold, a level which is 10 dB lower than the non-operation level calculated at step S1001, and stores the threshold therein (step S1002). Following step S1002, the output control section 3160 starts the operations of the fixed filters 3101 to 3120, to start the outputs of control signals therefrom, and outputs an operation signal to the level determination section 3170 (step S1003).

Returning to FIG. 14, the description is continued. Based on the operation signal, the level determination section 3170 calculates the level of the output signal from the BPF 3150 as an operation level (step S101). Following step S101, the level determination section 3170 determines whether or not the operation level calculated at step S101 is higher than the threshold stored therein (step S102).

When the level determination section 3170 determines that the operation level is higher than the threshold (Yes at step S1102), the level determination section 3170 determines that "the given noise has become unstable", and outputs an output stop signal to the output control section 4000 (step S103). Based on the output stop signal, the output control section 4000 stops the operations of the fixed filters in the controlling filter section 1000, to stop the outputs of the control signals therefrom (step S104). Following step S104, the noise control device determines whether or not to finish the noise determination processing and the output control processing (step S105). When the noise determination processing and the output control processing are not to be finished (No at step S105), the processing returns to step S101.

On the other hand, when the level determination section 3170 determines that the operation level is equal to or lower than the threshold (No at step S102), the level determination section 3170 determines that "the given noise is stable", and outputs an output start signal to the output control section 4000 (step S106). Based on the output start signal, the output control section 4000 starts the operations of the fixed filters in the controlling filter section 1000, to start the outputs of the control signals therefrom (step S107). Following step S107, the noise control device determines whether or not to finish the noise determination processing and the output control processing (step S108). When the noise determination processing and the output control processing are not to be finished (No at step S108), the processing returns to step S101.

As described above, the noise control device of the present embodiment stops the outputs of control signals when the noise has become unstable. Thus, a possibility that a noise arriving at the control point is increased as compared to a case where the noise control is not performed can be eliminated. Further, the noise control device of the present embodiment controls the noise by using only the fixed filters as filters. This allows a reduced scale of circuits to be realized as compared with a case where a noise control device using adaptive filters is used. Thus, according to the present embodiment, it is possible to provide a noise control device in which a possibility that a noise arriving at a control point is increased as compared to a case where the noise control is not performed can be eliminated and the circuit scale thereof can be reduced.

In the description above, the noise determination section 3000 includes the BPF 3150. However, the present invention is not limited thereto. The noise determination section 3000 may include, for example, a low pass filter, a high pass filter, an all path filter, or the like, instead of the BPF 3150.

Moreover, in the description above, the level determination section 3170 calculates the overall level of the output signal from the BPF 3150. However, the present invention is not limited thereto. For example, the level determination section 3170 may be provided with an FFT function to directly determine the frequency characteristics as shown in FIG. 4, and directly read the level at a predetermined frequency (for example, 50 Hz, 100 Hz, 500 Hz, etc.), to determine whether or not the level at the frequency is higher than the threshold.

Moreover, in the description above, the level determination section 3170 sets, as a threshold, a level which is 10 dB lower than the non-operation level. However, the present invention is not limited thereto. The threshold may be at a level lower than the non-operation level, and thus may be, for example, 6 dB lower than the non-operation level.

Further, in the description above, only one threshold is set in the level determination section 3170. However, two thresholds may be set. For example, it is assumed that a first threshold lower than the non-operation level and a second threshold lower than the first threshold are set. In this case, the level determination section 3170 determines whether or not the level of the output signal from the BPF 3150 is higher than the first threshold, and whether or not the level of the output signal from the BPF 3150 is higher than the second threshold. When the level determination section 3170 determines that the operation level is higher than the first threshold, the level determination section 3170 determines that "the given noise has become unstable", and outputs an output stop signal to the output control section 4000. On the other hand, when the level determination section 3170 determines that the operation level is equal to or lower than the second threshold, the level determination section 3170 determines that "the given noise is stable", and outputs an output start signal to the output control section 4000. In this manner, the level determination section 3170 does not determine a level between the first threshold and the second threshold, thereby enabling smooth stop/start of the output of a control signal even when there is an abrupt change of the given noise.

Further, in the description above, the output control section 4000 stops or starts the outputs of control signals by stopping or starting the operations of the fixed filters in the controlling filter section 1000. However, the present invention is not limited thereto. For example, a switch may be further provided in a latter stage of each of the adders 1301 to 1304 in the controlling filter section 1000, and the switch may be turned on or off to stop or start the output of a control signal therefrom.

Further, in the description above, the noise control device is provided with 20 noise microphones 1101 to 1120 in total and 4 control speakers 1401 to 1404 in total. However, the noise control device may be provided with one noise microphone and one control speaker. In such a case, each of the controlling filter section 1000 and the noise determination section 3000 is provided with one fixed filter. Note that in this case, since the noise microphone cannot be used as the determining error microphone 3130 in the noise determination section 3000, it is necessary to prepare another microphone in addition to the noise microphone.

Second Embodiment

According to the first embodiment, when the variation amount of the frequency and/or the level of the noise arriving at the control point is equal to or less than the predetermined amount, the noise is determined as being stable, and the output of the control signals is not stopped. Actually, however, even when the noise is determined as being stable, the noise is varying at a level equal to or less than the predetermined amount. For example, while an airplane is flying at a cruising speed, the noise in the airplane varies due to the change of engine load and the like. The engine load varies, for example, due to the engine power being increased or decreased in accordance with the flight condition. A second embodiment aims to always achieve an optimum noise reduction effect by changing the filter coefficients set at the fixed filters in the controlling filter section 1000, into the optimum filter coefficients in accordance with the change of the noise, in a case where the noise is determined as being stable.

Figure 16:
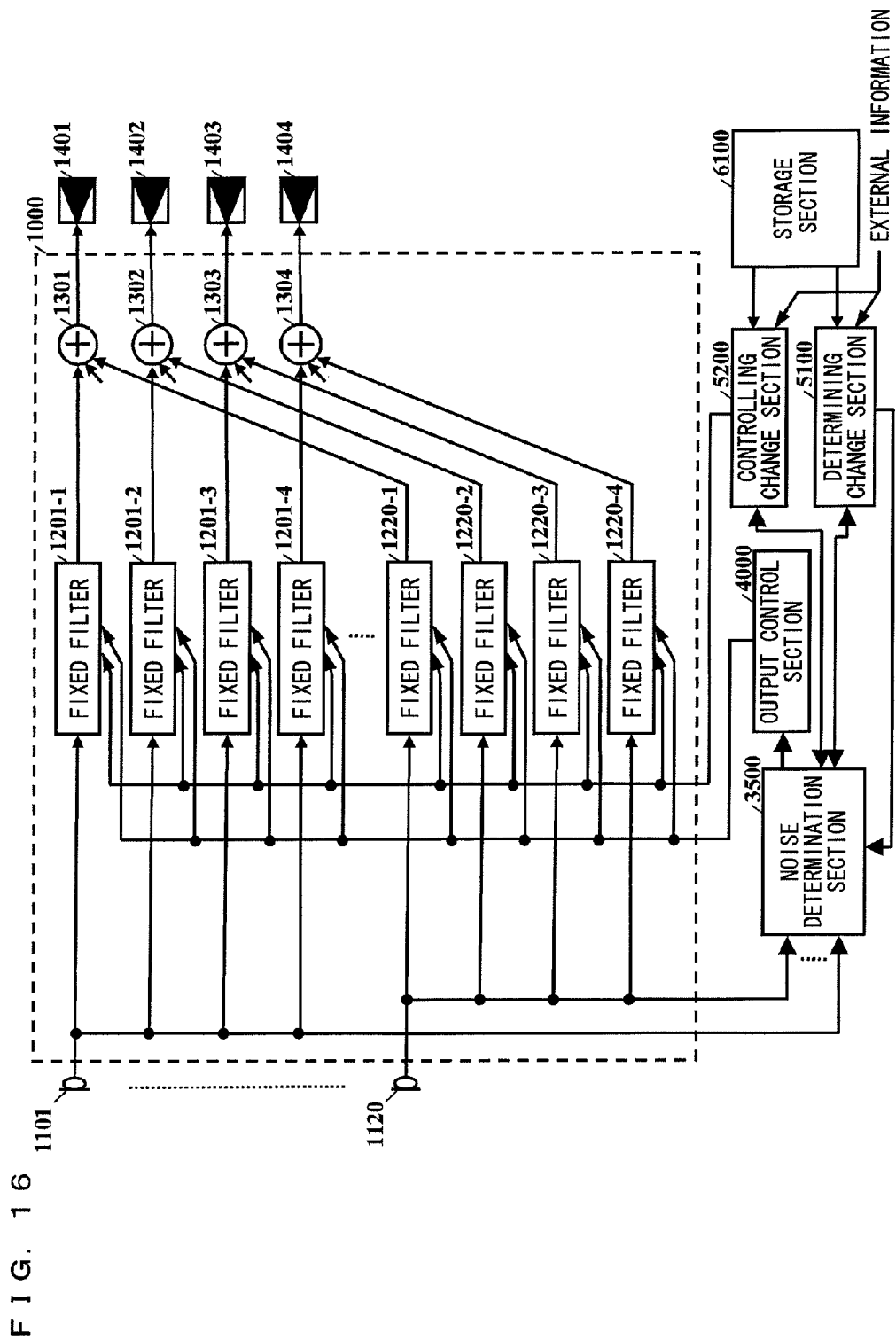
FIG. 16 is a diagram illustrating a circuit structure of a noise control device provided in the seat 2000 shown in FIG. 1 according to a second embodiment.

Hereinafter, with reference to FIG. 16, a structure of a noise control device according to the second embodiment will be specifically described. FIG. 16 is a diagram illustrating a circuit structure of a noise control device, provided in the seat 2000 shown in FIG. 1, according to the second embodiment. In FIG. 16, as in the first embodiment, the target to control is a noise in an airplane, and the given noise is generated in an airplane flying at a cruising speed.

In FIG. 16, a noise control device includes noise microphones 1101 to 1120, a controlling filter section 1000, control speakers 1401 to 1404, a noise determination section 3500, an output control section 4000, a determining change section 5100, a controlling change section 5200, and a storage section 6100. The noise control device according to the present embodiment differs from that shown in FIG. 11, in that, in the noise control device according to the present embodiment, the noise determination section 3500 is used instead of the noise determination section 3000, and the determining change section 5100, the controlling change section 5200, and the storage section 6100 are provided in addition. The other components are the same as those of the noise control device as shown in FIG. 11, and like parts are denoted by the same reference numerals as in FIG. 11.

Figure 17:
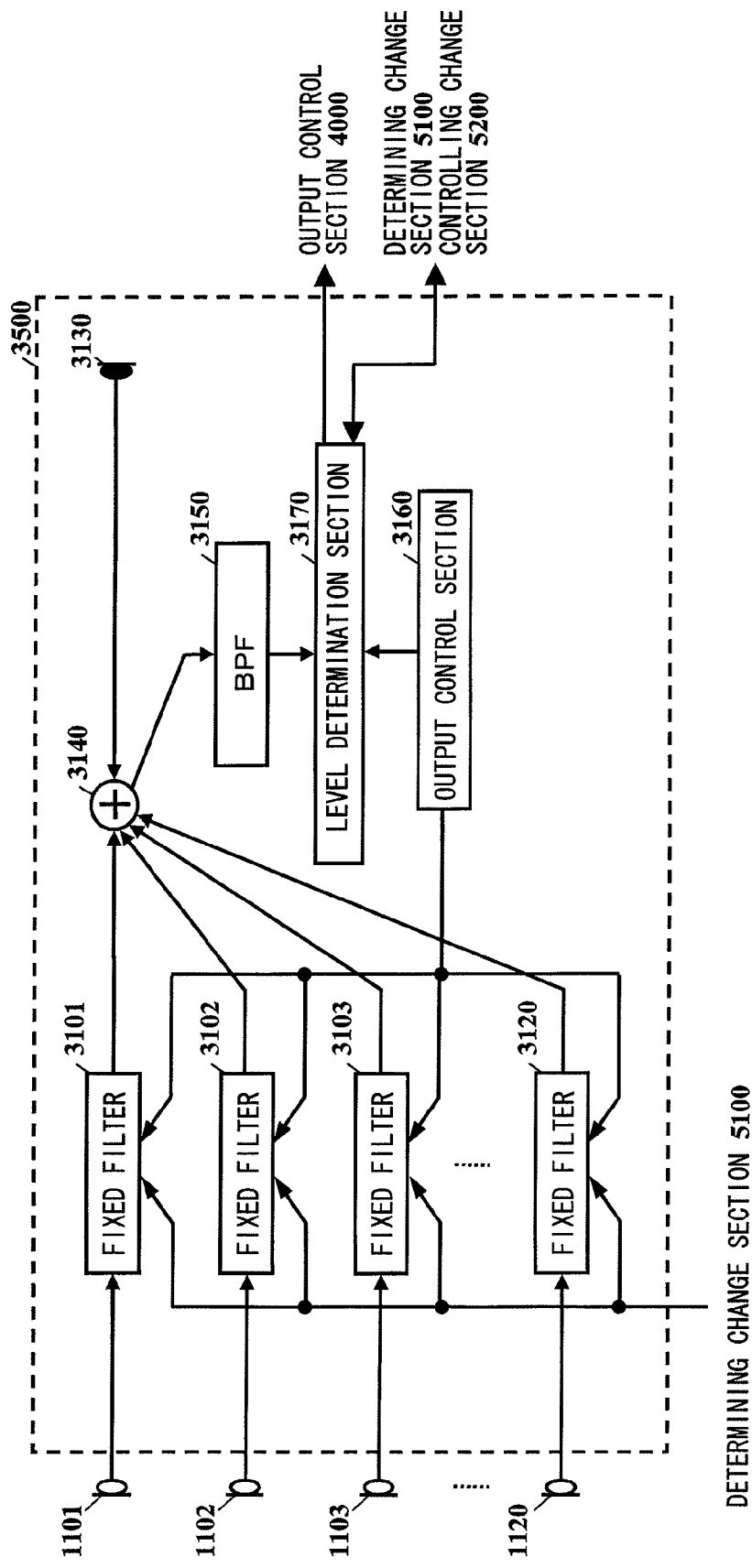
FIG. 17 is a diagram illustrating a specific circuit structure of a noise determination section 3500.

The specific structure of the noise determination section 3500 is shown in FIG. 17. FIG. 17 is a diagram illustrating a specific circuit structure of the noise determination section 3500. As shown in FIG. 17, the structure of the noise determination section 3500 differs from that of the noise determination section 3000 shown in FIG. 12 in that, in the noise determination section 3500, the filter coefficients of the fixed filters 3101 to 3120 are changed by the determining change section 5100. The other components are the same as those of the noise determination section 3000 shown in FIG. 12, and descriptions thereof will be omitted. The processing performed by the noise determination section 3500 slightly differs from that performed by the noise determination section 3000. Details thereof will be described below in the description of noise determination processing and the output control processing.

The determining change section 5100 reads, from the storage section 6100, filter coefficients associated with inputted external information. The external information will be described below. The determining change section 5100 changes the filter coefficients set to the fixed filters in the noise determination section 3500, into the filter coefficients read from the storage section 6100, respectively.

The controlling change section 5200 reads, from the storage section 6100, filter coefficients associated with inputted external information. The external information will be described below. The controlling change section 5200 changes the filter coefficients set to the fixed filters in the controlling filter section 1000, into the filter coefficients read from the storage section 6100, respectively.

As shown in FIG. 18, the filter coefficients to be set to the fixed filters in the noise determination section 3500 and in the controlling filter section 1000, and the external information are stored in the storage section 6100 to be associated with each other. FIG. 18 is a diagram illustrating a structure of data stored in the storage section 6100. The external information stored in the storage section 6100 uniquely specifies the frequency and/or the level of a noise. The external information which causes the variation amount to be equal to or less than a predetermined amount includes, for example, information about engine load, information about flight altitude, information about flying speed, information about current position, and weather information. A plurality of kinds of such external information are stored in the storage section 6100. In an example shown in FIG. 18, information about the engine load is associated with the filter coefficients to be set to the fixed filters in the noise determination section 3500 and in the controlling filter section 1000. The noise determination section 3500 has 20 fixed filters, and the controlling filter section 1000 has 80 fixed filters. The numerals 1 to 5 shown in FIG. 18 represent the magnitude of the engine load, and a group ("−1" to "−5") including the 100 filter coefficients (x1 to x20, y1 to y80) is provided in accordance with the magnitude of the engine load.

Figure 19:
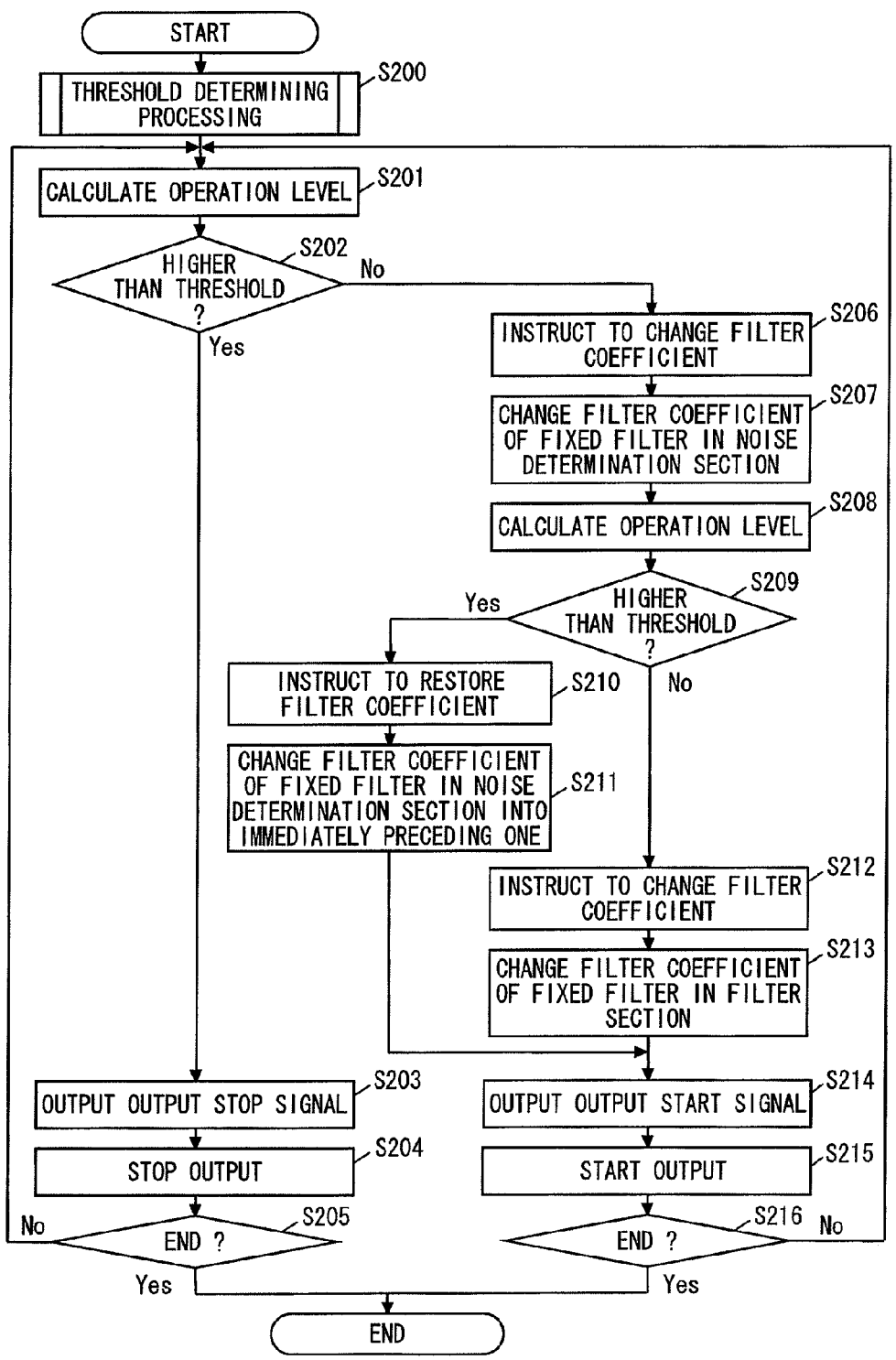
FIG. 19 is a flow chart showing a flow of noise determination processing and output control processing according to the second embodiment.

Hereinafter, with reference to FIG. 19, a flow of the noise determination processing and the output control processing will be described. FIG. 19 is a flow chart showing the flow of the noise determination processing and the output control processing according to the second embodiment. The following processing is performed when all the fixed filters in the controlling filter section 1000 and in the noise determination section 3000 are operating. Moreover, in the initial state of the noise determination section 3000, the frequency and/or the level of the given noise are varying within a certain range of variation.

In FIG. 19, once the processing is started, processing for determining a threshold is performed in the initial state of the noise determination section 3000 (step S200). Since the processing of step S200 is the same as the processing shown in FIG. 15, descriptions thereof will be omitted. Based on the operation signal, the level determination section 3170 calculates the level of the output signal from the BPF 3150 as an operation level (step S201). Following step S201, the level determination section 3170 determines whether or not the operation level calculated at step 201 is higher than the threshold stored therein (step S202).

When the level determination section 3170 determines that the operation level is higher than the threshold (Yes at step S202), the level determination section 3170 determines that "the given noise has become unstable", and outputs an output stop signal to the output control section 4000 (step S203). Based on the output stop signal, the output control section 4000 stops the operations of the fixed filters in the controlling filter section 1000, to stop the outputs of the control signals (step S204). Following step S204, the noise control device determines whether or not to finish the noise determination processing and the output control processing (step S205). When the noise determination processing and the output control processing are not to be finished (No at step S205), the processing returns to step S201.

On the other hand, when the level determination section 3170 determines that the operation level is equal to or lower than the threshold (No at step S202), the level determination section 3170 determines that "the given noise is stable", and outputs, to the determining change section 5100, a change instruction signal indicating the instruction for changing the filter coefficients (step S206). Upon receiving the change instruction signal from the level determination section 3170, the determining change section 5100 reads, from the storage section 6100, filter coefficients associated with the inputted external information, changes the filter coefficients set to the fixed filters in the noise determination section 3500, into the filter coefficients read from the storage section 6100, respectively, and outputs a change completion signal indicating the completion of the change, to the level determination section 3170 (step S207). Upon receiving the change completion signal from the determining change section 5100, the level determination section 3170 calculates the level of the output signal from the BPF 3150 as an operation level (step S208). Then, the level determination section 3170 determines whether or not the calculated operation level is higher than the threshold stored therein (step S209).

When the level determination section 3170 determines that the operation level is higher than the threshold (Yes at step S209), the level determination section 3170 outputs, to the determining change section 5100, a restoration instruction signal indicating the instruction for restoring the changed filter coefficients to the immediately preceding filter coefficients (step S210). Upon receiving the restoration instruction signal from the level determination section 3170, the determining change section 5100 changes the filter coefficients set to the fixed filters in the noise determination section 3500, into the immediately preceding filter coefficients, and outputs a restoration completion signal indicating the completion of the restoration, to the level determination section 3170 (step S211).

On the other hand, when the level determination section 3170 determines that the operation level is equal to or lower than the threshold (No at step S209), the level determination section 3170 outputs a change instruction signal indicating the instruction for changing the filter coefficients, to the controlling change section 5200 (step S212). Upon receiving the change instruction signal from the level determination section 3170, the controlling change section 5200 reads, from the storage section 6100, filter coefficients associated with the inputted external information, changes the filter coefficients set to the fixed filters in the controlling filter section 1000, into the filter coefficients read from the storage section 6100, respectively, and outputs a change completion signal indicating the completion of the change, to the level determination section 3170 (step S213).

Upon receiving the restoration completion signal outputted at step S211 or the change completion signal outputted at step S213, the level determination section 3170 outputs an output start signal to the output control section 4000 (step S214). Based on the output start signal, the output control section 4000 starts the operations of the fixed filters in the controlling filter section 1000, to start the outputs of the control signals therefrom (step S215). Following step S215, the noise control device determines whether or not to finish the noise determination processing and the output control processing (step S216). When the noise determination processing and the output control processing are not to be finished (No at step S216), the processing returns to step S201.

As described above, when the given noise is determined as being stable, the noise control device according to the present embodiment changes the filter coefficients set to the fixed filters in the controlling filter section 1000, into the optimum filter coefficients in accordance with the change of the noise. Accordingly, in the noise control device according to the present embodiment, it is possible to always achieve an optimum noise reduction effect when the noise is determined as being stable. Note that in the processing of changing the filter coefficients, unlike in the coefficient update processing performed by adaptive filters, the filter coefficients associated with the external information are simply selected. Accordingly, even when the change processing according to the present embodiment is performed, it is possible to reduce a scale of a circuit, as compared with a case where adaptive filters are used.

In the description above, the information about an airplane is used as the external information. However, the present invention is not limited thereto. For example, when the noise control device is provided in a train or a car, information, such as a traveling position and a travel speed, for uniquely specifying the frequency and/or the level of the noise, may be used as the external information. To be specific, in the case of a train, which runs on previously provided rails, the traveling position can be specified by combining the route information and information of distances of the routes, and the like. Thus, the specified traveling position can be used as external information. In this case, whether the traveling position is in a tunnel or on an iron bridge can be known in advance. Therefore, the traveling position can be used as external information which uniquely specifies the frequency and/or the level of the noise. In the case of a car, it is more difficult to know in advance the frequency and/or the level of a noise than in the case of a train since there are many roads, some of which are complicated, and a wide variety of ambient environments. However, by using a car-navigation system, road infrastructure information, and the like in combination, it is also possible to produce external information which uniquely specifies the frequency and/or the level of the noise.

As known from the description above, the determining change section 5100 changes the filter coefficients set to the fixed filters in the noise determination section 3500, and then the level determination section 3170 performs determination again. This is performed for verification of the reliability of the external information. When no such verification is needed, however, the controlling change section 5200 may directly change the filter coefficients set to the fixed filters in the controlling filter section 1000.

Third Embodiment

The noise determination sections 3000 and 3500 according to the first and second embodiments have the circuit structures as shown in FIG. 12 and FIG. 17, respectively, and whether or not the variation amount of the frequency and/or the level of a noise arriving at the control point is larger than the predetermined amount is determined in the level determination at the level determination section 3170. In contrast, the present embodiment aims to determine whether or not the variation amount of the frequency and/or the level of a noise arriving at the control point is larger than the predetermined amount, without performing level determination.

Figure 20:
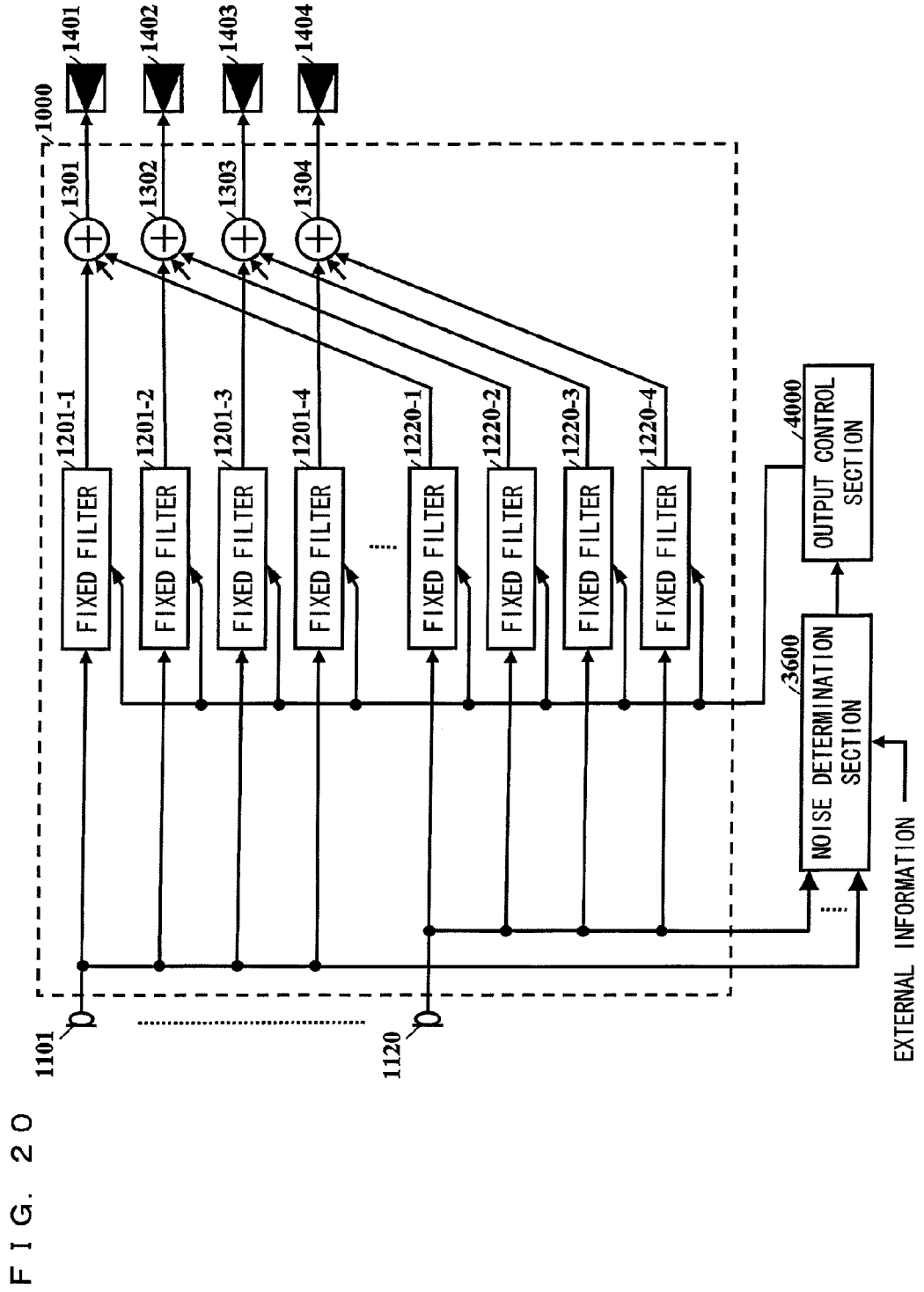
FIG. 20 is a diagram illustrating a circuit structure of a noise control device provided in the seat 2000 shown in FIG. 1 according to a third embodiment.

Hereinafter, with reference to FIG. 20, a structure of a noise control device according to the third embodiment will be specifically described. FIG. 20 is a diagram illustrating a circuit structure of the noise control device, provided in the seat 2000 shown in FIG. 1, according to the third embodiment. In FIG. 20, as in the first embodiment, the target to control is a noise in an airplane, and the given noise is generated in an airplane flying at a cruising speed.

In FIG. 20, the noise control device includes noise microphones 1101 to 1120, a controlling filter section 1000, control speakers 1401 to 1404, a noise determination section 3600, and an output control section 4000. The noise control device according to the present embodiment differs from that shown in FIG. 11 in that, in the noise control device according to the present embodiment, the noise determination section 3600 is used instead of the noise determination section 3000. The other components are the same as those of the noise control device shown in FIG. 11, and like parts are denoted by the same reference numerals as in FIG. 11.

Based on inputted external information, the noise determination section 3600 determines whether or not the variation amount of the frequency and/or the level of the given noise arriving at the control point is larger than a predetermined amount. When the variation amount is equal to or less than the predetermined amount, the noise determination section 3600 determines that the given noise is stable, and outputs, to the output control section 4000, an output start signal for starting the output of an control signal from each of the fixed filters 1201-1 to 1220-4. When the noise determination section 3600 determines, based on the inputted external information, that the variation amount is larger than the predetermined amount, the noise determination section 3600 determines that the given noise has become unstable, and outputs, to the output control section 4000, an output stop signal for stopping the output from each of the fixed filters 1201-1 to 1220-4.

As in the second embodiment, the external information of the present embodiment uniquely specifies the frequency and/or the level of the noise. External information which causes the variation amount to be larger than a predetermined amount includes, for example, altitude information, seat belt sign, speed information, and current position. Hereinafter, description will be given on how the noise determination section 3600 performs determination for each piece of external information. An airplane starts to level off at an altitude equal to or higher than a predetermined altitude (for example, 10000 feet) and to cruise at a constant speed. Thus, variation of a given noise is reduced at an altitude equal to or higher than a certain altitude (for example, 10000 feet), and then the variation amount will be equal to or less than a predetermined amount. Therefore, in a case where the altitude is used as the external information, the noise determination section 3600 is able to determine that the variation amount is equal to or less than the predetermined amount when the altitude is equal to or higher than a predetermined altitude, and that the variation amount is larger than the predetermined amount when the altitude is lower than the predetermined altitude. Meanwhile, a seat belt sign disappears (is turned off) in the cruising state. Accordingly, in a case where the seat belt sign is used as the external information, the noise determination section 3600 is able to determine that the variation amount is equal to or less than the predetermined amount when the seat belt sign is OFF, and that the variation amount is larger than the predetermined amount when the seat belt sign is ON. Further, a cruising airplane flies at a constant speed. Accordingly, in a case where the speed is used as the external information, the noise determination section 3600 is able to determine that the variation amount is equal to or less than a predetermined amount when the speed is constant, and that the variation amount is larger than the predetermined amount when the speed is not constant. Moreover, when an airplane comes to a location where airflow turbulences occur, the variation amount of a given noise is increased to be larger than the predetermined amount. Note that such a location can be specified in advance based on the weather information of the day on which an airplane flies. Accordingly, in a case where the current position is used as the external information, the noise determination section 3600 is able to determine that the variation amount is equal to or less than a predetermined amount when the current position fails to agree with the location specified in advance, and that the variation amount is larger than the predetermined amount when the current position agrees with the location specified in advance.

Figure 21:
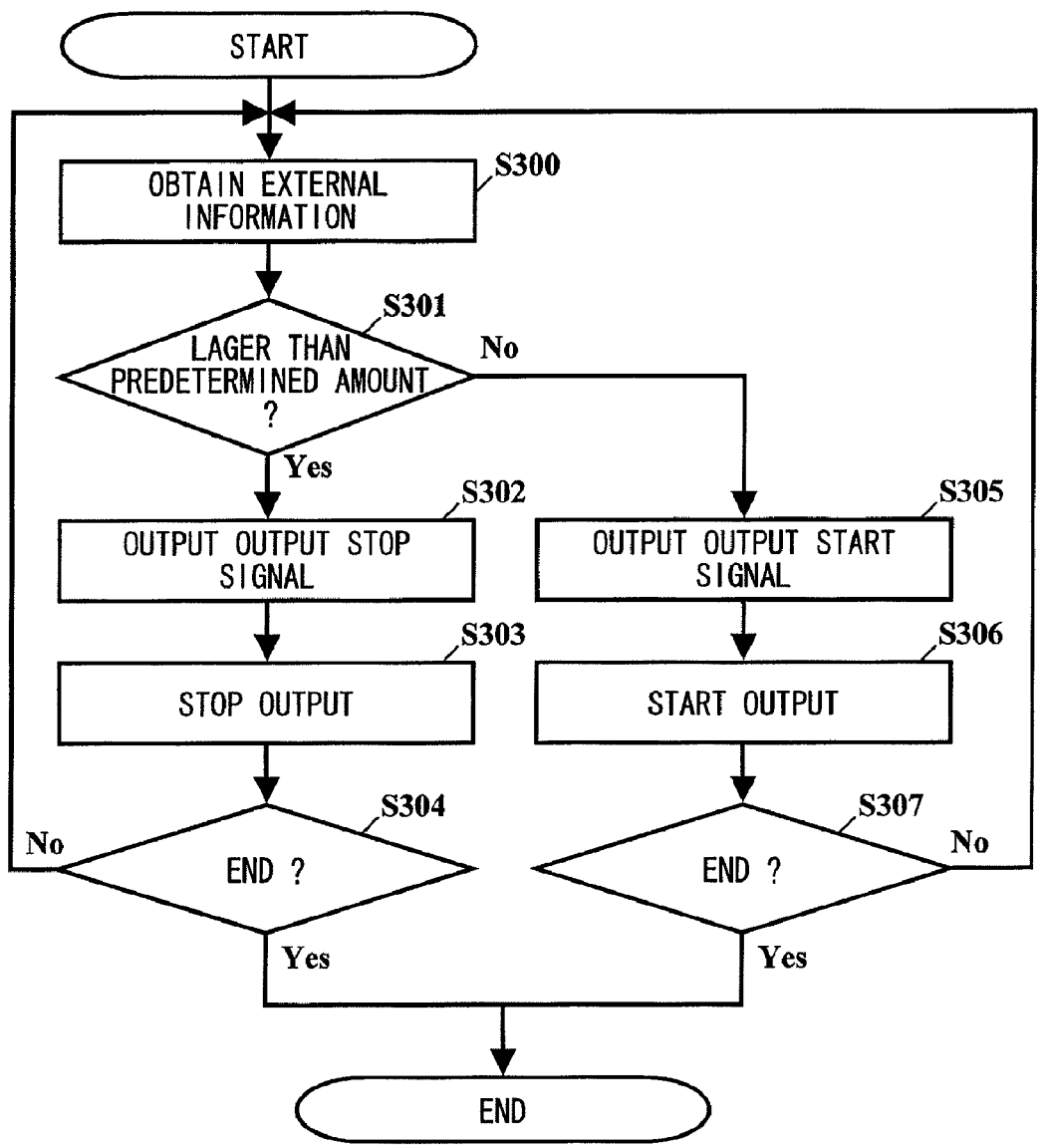
FIG. 21 is a flow chart showing a flow of noise determination processing and output control processing according to the third embodiment.

Hereinafter, with reference to FIG. 21, a flow of the noise determination processing and the output control processing according to the third embodiment will be described. FIG. 21 is a flow chart showing the flow of the noise determination processing and the output control processing according to the third embodiment. The following processing is performed when all the fixed filters in the controlling filter section 1000 and in the noise determination section 3600 are operating.

In FIG. 21, once the processing is started, the noise determination section 3600 obtains external information (step S300). Based on the external information obtained at step S300, the noise determination section 3600 determines whether or not the variation amount of the frequency and/or the level of a given noise arriving at the control point is larger than a predetermined amount (step S301). When the noise determination section 3600 determines that the variation amount is larger than the predetermined amount (Yes at step S301), the noise determination section 3600 determines that "the given noise has become unstable", and outputs an output stop signal to the output control section 4000 (step S302). Based on the output stop signal, the output control section 4000 stops the operations of the fixed filters in the controlling filter section 1000, to stop the outputs of the control signals (step S303). Following step S303, the noise control device determines whether or not to finish the noise determination processing and the output control processing (step S304). When the noise determination processing and the output control processing are not to be finished (No at step S304), the processing returns to step S300.

Meanwhile, when the noise determination section 3600 determines that the variation amount is equal to or less than the predetermined amount (No at step S301), the noise determination section 3600 determines that "the given noise is stable", and outputs an output start signal to the output control section 4000 (step S305). Based on the output start signal, the output control section 4000 starts the operations of the fixed filters in the controlling filter section 1000, to start the outputs of the control signals (step S306). Following step S306, the noise control device determines whether or not to finish the noise determination processing and the output control processing (step S307). When the noise determination processing and the output control processing are not to be finished (No at step S307), the processing returns to step S300.

As described above, the noise control device according to the present embodiment stops the outputs of control signals when the noise becomes unstable. Thus, a possibility that a noise arriving at the control point is increased as compared to a case where the noise control is not performed can be eliminated. Further, in the noise control device according to the present embodiment, filters used for controlling the noise are the fixed filters only. This allows a circuit scale to be reduced as compared with a case where adaptive filters are used. Thus, according to the present embodiment, it is possible to provide a noise control device in which a possibility that a noise arriving at a control point is increased as compared to a case where the noise control is not performed can be eliminated and the circuit scale can be reduced.

In the description above, the noise determination section 3600 uses altitude information, seat belt sign, speed information, and current position as the external information. However, the present invention is not limited to this, but other external information may be used. Further, for enhancing determination accuracy, the noise determination section 3600 may perform determination using, for example, the altitude information, the seat belt sign, the speed information, and the current position in any combination thereof. Moreover, the determination performed using the external information at the noise determination section 3600 may be used in combination with the first and the second embodiment. Accordingly, accuracy of determination is highly enhanced.

The noise determination section 3600 may use the seating information indicating whether or not the crew member A is seated, in addition to the external information described above. For example, if a sensor is provided in the seat 2000 to detect whether or not the crew member A is seated, a detection signal from the sensor can be obtained as a signal indicating the seating information. The noise determination section 3600 determines whether or not the crew member A is seated, based on the seating information. The noise determination section 3600 outputs an output start signal to the output control section 4000 when the noise determination section 3600 determines that the crew member A is seated. The noise determination section 3600 outputs an output stop signal to the output control section 4000 when the noise determination section 3600 determines that the crew member A is not seated. Accordingly, unnecessary noise control can be stopped and the amount of computation can be reduced.

Fourth Embodiment

According to the third embodiment, when the variation amount of the frequency and/or the level of the noise arriving at the control point is equal to or less than a predetermined amount, the noise is determined as being stable, and the outputs of the control signals are not stopped. Actually, however, even when the noise is determined as being stable, the noise is varying at a level equal to or less than the predetermined amount as described in the second embodiment. A fourth embodiment aims to always achieve an optimum noise reduction effect by changing the filter coefficients set at the fixed filters in the controlling filter section 1000, into the optimum filter coefficients in accordance with the change of the noise, in a case where the noise is determined as being stable.

Figure 22:
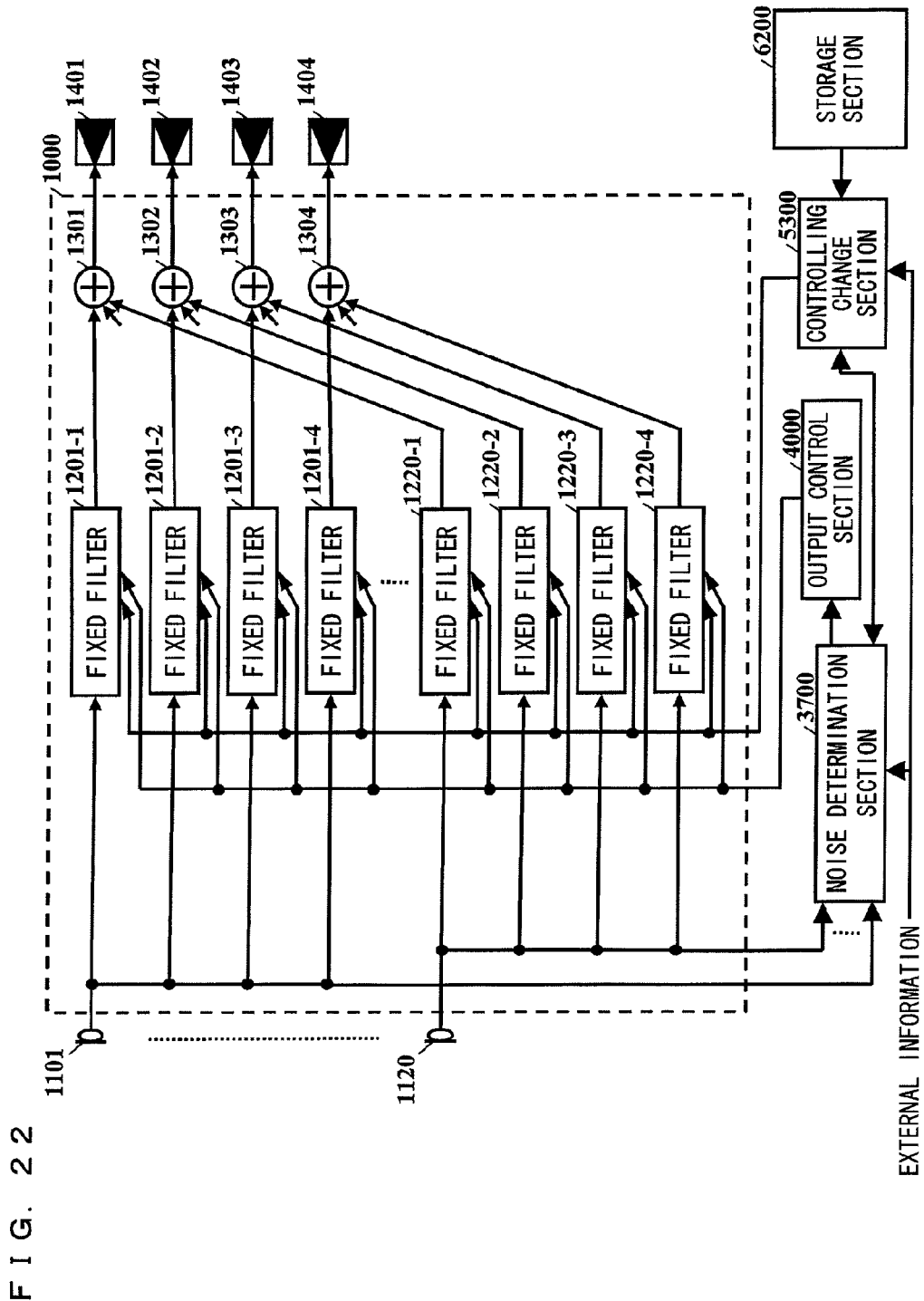
FIG. 22 is a diagram illustrating a circuit structure of a noise control device provided in the seat 2000 shown in FIG. 1 according to a fourth embodiment.

Hereinafter, with reference to FIG. 22, a structure of a noise control device according to the fourth embodiment will be specifically described. FIG. 22 is a diagram illustrating a circuit structure of the noise control device, provided in the seat 2000 shown in FIG. 1, according to the fourth embodiment. In FIG. 22, as in the first embodiment, the target to control is a noise in an airplane, and a given noise is generated in an airplane flying at a cruising speed.

In FIG. 22, the noise control device includes noise microphones 1101 to 1120, a controlling filter section 1000, control speakers 1401 to 1404, a noise determination section 3700, an output control section 4000, a controlling change section 5300, and a storage section 6200. The noise control device according to the present embodiment differs from that shown in FIG. 20, in that, in the noise control device according to the present embodiment, the noise determination section 3700 is used instead of the noise determination section 3600, and the controlling change section 5300 and the storage section 6200 are provided in addition. The other components are the same as those of the noise control device shown in FIG. 20, and like parts are denoted by the same reference numerals as in FIG. 20. The processing performed by the noise determination section 3700 slightly differs from that performed by the noise determination section 3600. Details thereof will be described below in the description of the noise determination processing and the output control processing.

The controlling change section 5300 reads, from the storage section 6200, filter coefficients associated with inputted external information. The external information will be described below. The controlling change section 5300 changes the filter coefficients set at the fixed filters in the controlling filter section 1000 into the filter coefficients read from the storage section 6200, respectively.

As shown in FIG. 23, the filter coefficients to be set to the fixed filters in the controlling filter section 1000 and the external information are stored in the storage section 6200, to be associated with each other. FIG. 23 is a diagram illustrating a structure of data stored in the storage section 6200. The external information stored in the storage section 6200 uniquely specifies the frequency and/or the level of a noise, as in the third embodiment. The external information which causes the variation amount to be equal to or less than a predetermined amount includes, for example, information about engine load, information about flight altitude, information about flying speed, information about current position, and weather information. A plurality of kinds of external information are stored in the storage section 6200. In an example shown in FIG. 23, the information about engine load is associated with the filter coefficients to be set at the fixed filters in the controlling filter section 1000. The controlling filter section 1000 has 80 fixed filters. The numerals 1 to 5 shown in FIG. 23 represent the magnitude of the engine load, and a group ("−1" to "−5") including the 80 filter coefficients (y1 to y80) is provided in accordance with the magnitude of the engine load.

Figure 24:
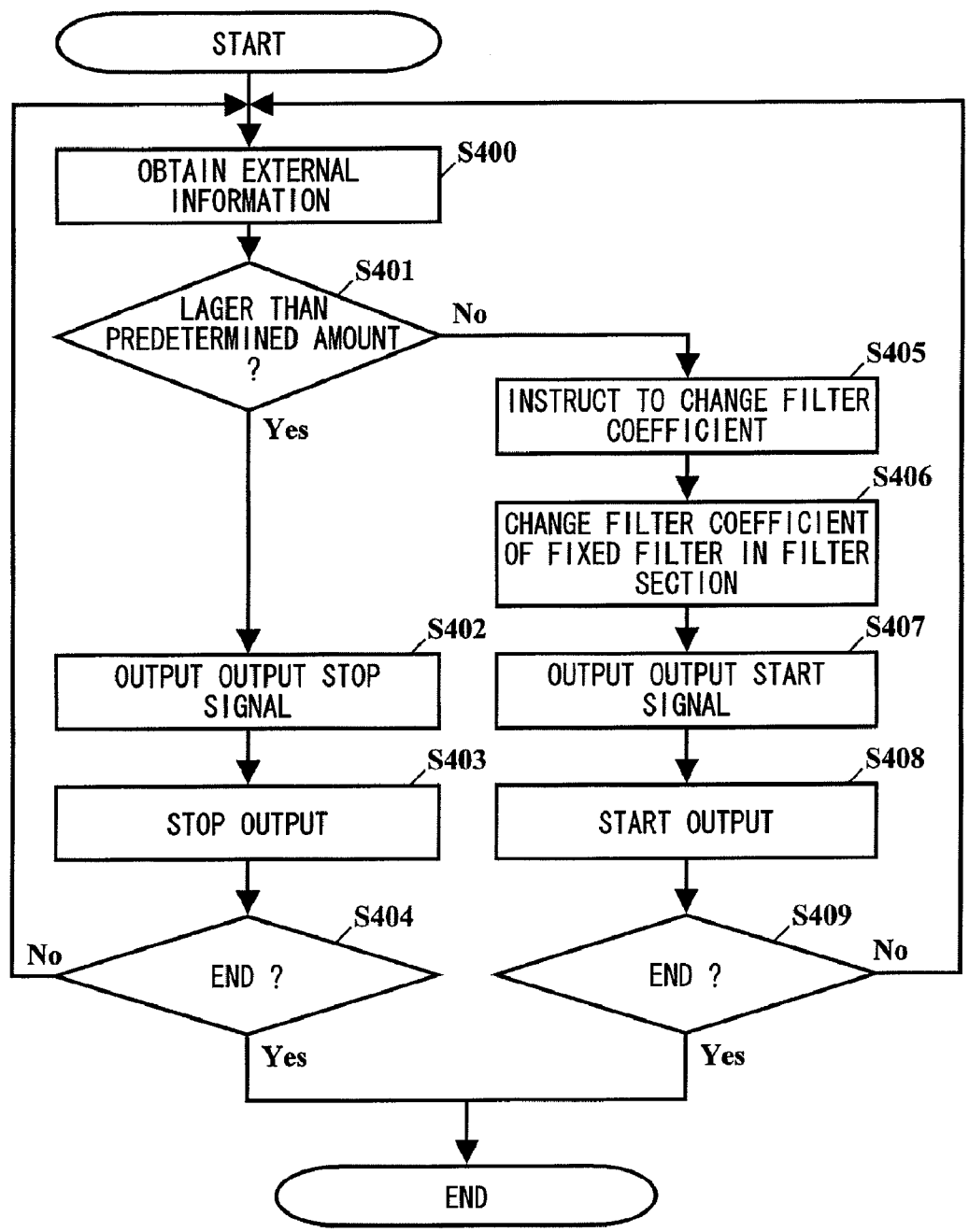
FIG. 24 is a flow chart showing a flow of noise determination processing and output control processing according to the fourth embodiment.

Hereinafter, with reference to FIG. 24, a flow of the noise determination processing and the output control processing according to the fourth embodiment will be described. FIG. 24 is a flow chart showing the flow of the noise determination processing and the output control processing according to the fourth embodiment. The following processing is performed when all the fixed filters in the controlling filter section 1000 and the noise determination section 3700 are operating.

In FIG. 24, once the processing is started, the noise determination section 3700 obtains the external information (step S400). Based on the external information obtained at step S400, the noise determination section 3700 determines whether or not the variation amount of the frequency and/or the level of a given noise arriving at the control point is larger than a predetermined amount (step S401). When the noise determination section 3700 determines that the variation amount is larger than the predetermined amount (Yes at step S401), the noise determination section 3700 determines that "the given noise has become unstable", and outputs an output stop signal to the output control section 4000 (step S402). Based on the output stop signal, the output control section 4000 stops the operations of the fixed filters in the controlling filter section 1000 to stop the outputs of the control signals (step S403). Following step S403, the noise control device determines whether or not to finish the noise determination processing and the output control processing (step S404). When the noise determination processing and the output control processing are not to be finished (No at step S404), the processing returns to step S400.

Meanwhile, when the noise determination section 3700 determines that the variation amount is equal to or less than the predetermined amount (No at step S401), the noise determination section 3700 determines that "the given noise is stable", and outputs, to the controlling change section 5300, a change instruction signal indicating the instruction for changing the filter coefficients (step S405). Upon receiving the change instruction signal from the noise determination section 3700, the controlling change section 5300 reads, from the storage section 6200, filter coefficients associated with the inputted external information, changes the filter coefficients set at the fixed filters in the controlling filter section 1000, into the filter coefficients read from the storage section 6200, respectively, and outputs a change completion signal indicating the completion of the change, to the noise determination section 3700 (step S406). Upon receiving the change completion signal from the controlling change section 5300, the noise determination section 3700 outputs an output start signal to the output control section 4000 (step S407). Based on the output start signal, the output control section 4000 starts the operations of the fixed filters in the controlling filter section 1000 to start the outputs of the control signals (step S408). Following step S408, the noise control device determines whether or not to finish the noise determination processing and the output control processing (step S409). When the noise determination processing and the output control processing are not to be finished (No at step S409), the processing returns to step S400.

As described above, when the given noise is determined as being stable, the noise control device according to the present embodiment changes the filter coefficients set to the fixed filters in the controlling filter section 1000, into the optimum filter coefficients in accordance with the change of the noise. Accordingly, in the noise control device according to the present embodiment, it is possible to always achieve an optimum noise reduction effect when the noise is determined as being stable. Note that in the processing of changing the filter coefficients, unlike in the coefficient update processing performed by adaptive filters, the filter coefficients associated with the external information are simply selected. Accordingly, even when the change processing according to the present embodiment is performed, it is possible to reduce a scale of a circuit, as compared with a case where adaptive filters are used.

Fifth Embodiment)

According to the first and the third embodiments, when the variation amount of the frequency and/or the level of the noise arriving at the control point is equal to or less than a predetermined amount, the noise is determined as being stable, and the output of the control signals is not stopped. However, even when the noise is determined as being stable, the noise is varying within the predetermined amount range as described in the second and the fourth embodiments. According to the second and the fourth embodiments, in a case where the noise is determined as being stable, the optimum noise reduction effect is always achieved by changing the filter coefficients set at the fixed filters in the controlling filter section 1000, into the optimum filter coefficients in accordance with the change of the noise, with reference to the storage sections 6100 and 6200.

However, even when the noise is determined as being stable, since the kind of the noise differs depending on the location of the seat, the filter coefficients stored in the storage sections 6100 and 6200 may not always be the optimum filter coefficients. Further, even if the filter coefficients stored in the storage sections 6100 and 6200 may be optimum in the initial state, the filter coefficients stored in the storage sections 6100 and 6200 may not necessarily be the optimum filter coefficients any longer if the seat location or the surrounding environment changes due to renewal, aged deterioration, and the like, of the equipment in the plane.

Furthermore, in a case where fixed filters are used, it is necessary to determine fixed filter coefficients thereof by a certain means. For example, with regard to a passenger mass transportation, such as an airplane, a large number of the seats therein requires work for individually determining the optimum filter coefficients for each seat. Moreover, when a model of an airplane is changed, conditions of a body, engines, and seats are all changed, and even the same model of airplane may have different engines depending on the airline company. Therefore, determination of the optimum filter coefficients for each seat in consideration of those conditions may result in a huge workload.

Therefore, a fifth embodiment aims to always achieve an optimum noise reduction effect by updating the filter coefficients set at the fixed filters in the controlling filter section 1000, to the optimum filter coefficients, associated with the seat location and the surrounding environment, in a case where the noise is determined as being stable. The fifth embodiment also aims to significantly reduce process steps for determining the optimum filter coefficients for each seat, by automatically updating the filter coefficient.

Figure 25:
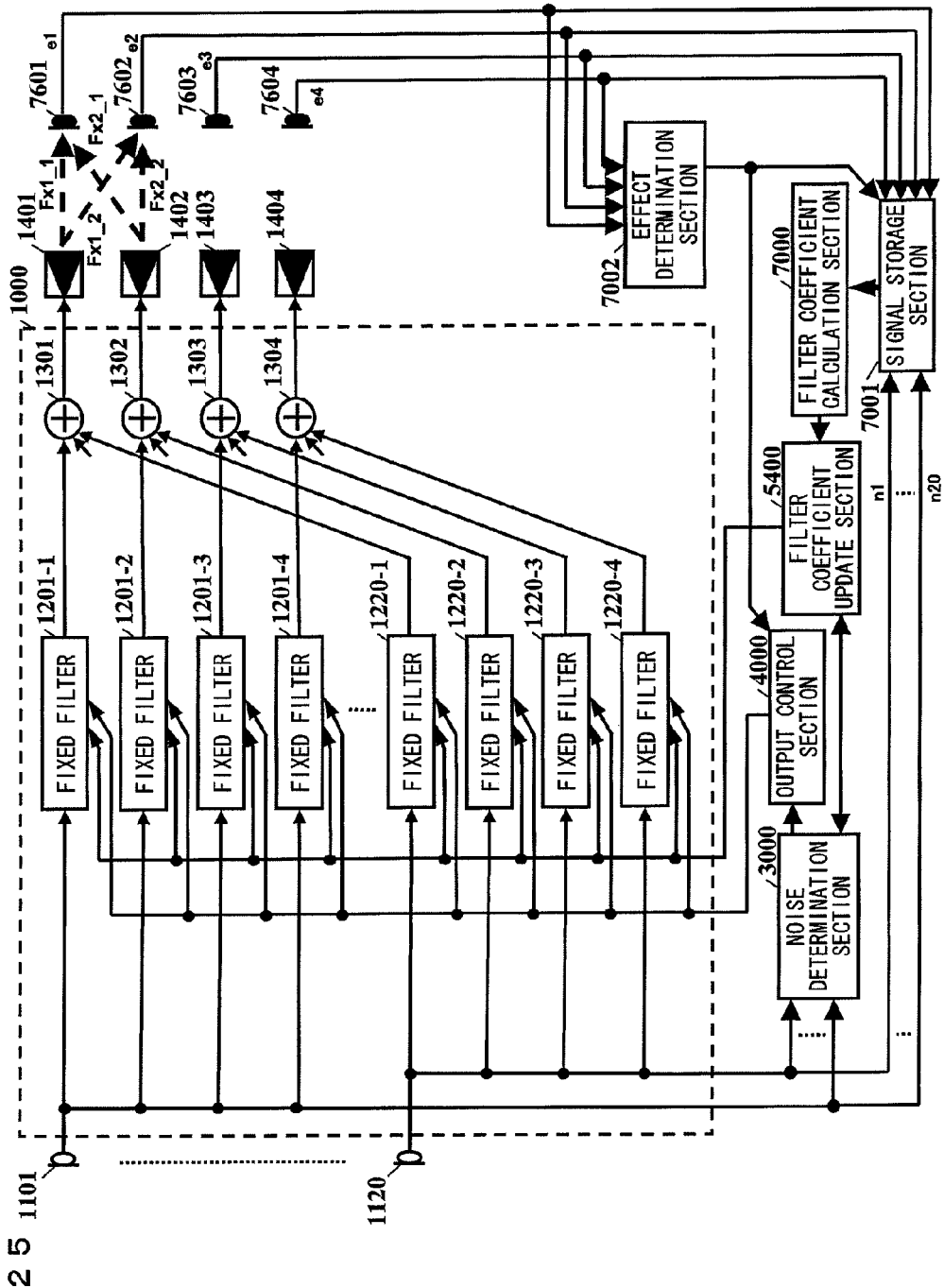
FIG. 25 is a diagram illustrating a circuit structure of the noise control device according to a fifth embodiment.

Hereinafter, with reference to FIG. 25, a structure of a noise control device according to the fifth embodiment will be specifically described. FIG. 25 is a diagram illustrating a circuit structure of the noise control device, provided in the seat 2000 shown in FIG. 1, according to the fifth embodiment. In FIG. 25, as in the first embodiment, the target to control is a noise in an airplane, and the given noise is generated in an airplane flying at a cruising speed.

In FIG. 25, the noise control device includes noise microphones 1101 to 1120, a controlling filter section 1000, control speakers 1401 to 1404, a noise determination section 3000, an output control section 4000, a filter coefficient update section 5400, a filter coefficient calculation section 7000, a signal storage section 7001, an effect determination section 7002, and error microphones 7601 to 7604. The noise control device according to the present embodiment differs from that shown in FIG. 11 in that, in the noise control device according to the present embodiment, the filter coefficient update section 5400, the filter coefficient calculation section 7000, the signal storage section 7001, the effect determination section 7002, and the error microphones 7601 to 7604 are provided in addition. The other components are the same as those of the noise control device shown in FIG. 11, and like parts are denoted by the same reference numerals as in FIG. 11. Note that the error microphones 7601 to 7604 are attached to the sheet, for example, in the vicinity of the ears of the user sitting on the seat.

Initially, as in the case of FIG. 11, a fixed filter coefficient is set as an initial value to each of the fixed filters 1201-1 to 1220-4. As in the case of FIG. 11, once the noise determination section 3000 determines that the noise condition is similar to that used to determine the initial filter coefficients, the output control section 4000 is caused to operate, noise signals from the noise microphones 1100 to 1120 are processed at the fixed filters 1201-1 to 1220-4 by using the fixed filter coefficients thereof, respectively, and control sounds are reproduced at the speakers 1401 to 1404, respectively. At each of the error microphones 7601 to 7604, the noise arriving at the location thereof and a reproduced control sound from each of the speakers 1401 to 1404 are combined to each other and the combination result is detected as an error signal.

Here, four error microphones are provided. However, as long as the number of the error microphones is equal to or lower than that of the speakers, it is theoretically possible to determine correct control coefficients for fixed filters, respectively. The acoustic characteristic between the speaker 1401 and the error microphone 7601 is indicated as $Fx1\_1$, the acoustic characteristic between the speaker 1401 and the error microphone 7602 is indicated as $Fx1\_2$, the acoustic characteristic between the speaker 1402 and the error microphone 7601 is indicated as $Fx2\_1$, and the acoustic characteristic between the speaker 1402 and the error microphone 7602 is indicated as $Fx2\_2$. However, other acoustic characteristics, such as the acoustic characteristic $Fx1\_3$ between the speaker 1401 and the error microphone 7603 and the acoustic characteristic $Fx4\_2$ between the speaker 1404 and the error microphone 7602, are not shown.

Now, each of the error signals detected at the error microphones 7601 to 7604 is inputted into the effect determination section 7002. The effect determination section 7000 determines whether or not a predetermined noise reduction effect is achieved. As an exemplary approach for this, for each error signal, a component in the noise control band is extracted, before and after the operation of the fixed filters 1201-1 to 1220-4, respectively, and then the levels of the extracted components are compared. As another exemplary approach, for each error signal, the levels of an error signal in the noise control band are averaged, before and after the operation of the fixed filters 1201-1 to 1220-4, respectively, and then the averaged levels before and after the operation of the fixed filters are compared with each other. As still another exemplary approach, the levels of error signals at a plurality of representative frequencies in the noise control band may be compared.

When the effect determination section 7000 determines through any such approach that the predetermined effect has been obtained, operations of the fixed filters 1201-1 to 1220-4 are continued to continue the noise control. However, when the predetermined effect is not obtained (including increase of a noise as well as an insufficient effect), the effect determination section 7000 informs the output control section 4000 of the determination that the noise control using these filter coefficients has become difficult. As a result, the output control section 4000 stops the operation of the fixed filters 1201-1 to 1220-4. Simultaneously, the effect determination section 7002 instructs the signal storage section 7001 to store the signals. In response to the instruction from the effect determination section 7002, the signal storage section 7001 records the noise signals n1 to n20 from the noise microphones 1101 to 1120 and the error signals e1 to e4 from the error microphones 7601 to 7604, in, for example, an internal memory for a predetermined duration. Upon completion of the recording, the signal storage section 7001 instructs the filter coefficient calculation section 7000 to start calculation of coefficients. In response to the instruction to start the calculation of coefficients, the filter coefficient calculation section 7000 calculates fixed filter coefficients for the controlling filter section 1000, using the data recorded in the signal storage section 7001. The filter coefficient update section 5400 reads the filter coefficients calculated at the filter coefficient calculation section 7000, at a predetermined timing, and updates the filter coefficients set at the fixed filters in the controlling filter section 1000, to the filter coefficients read from the filter coefficient calculation section 7000.

Figure 26:
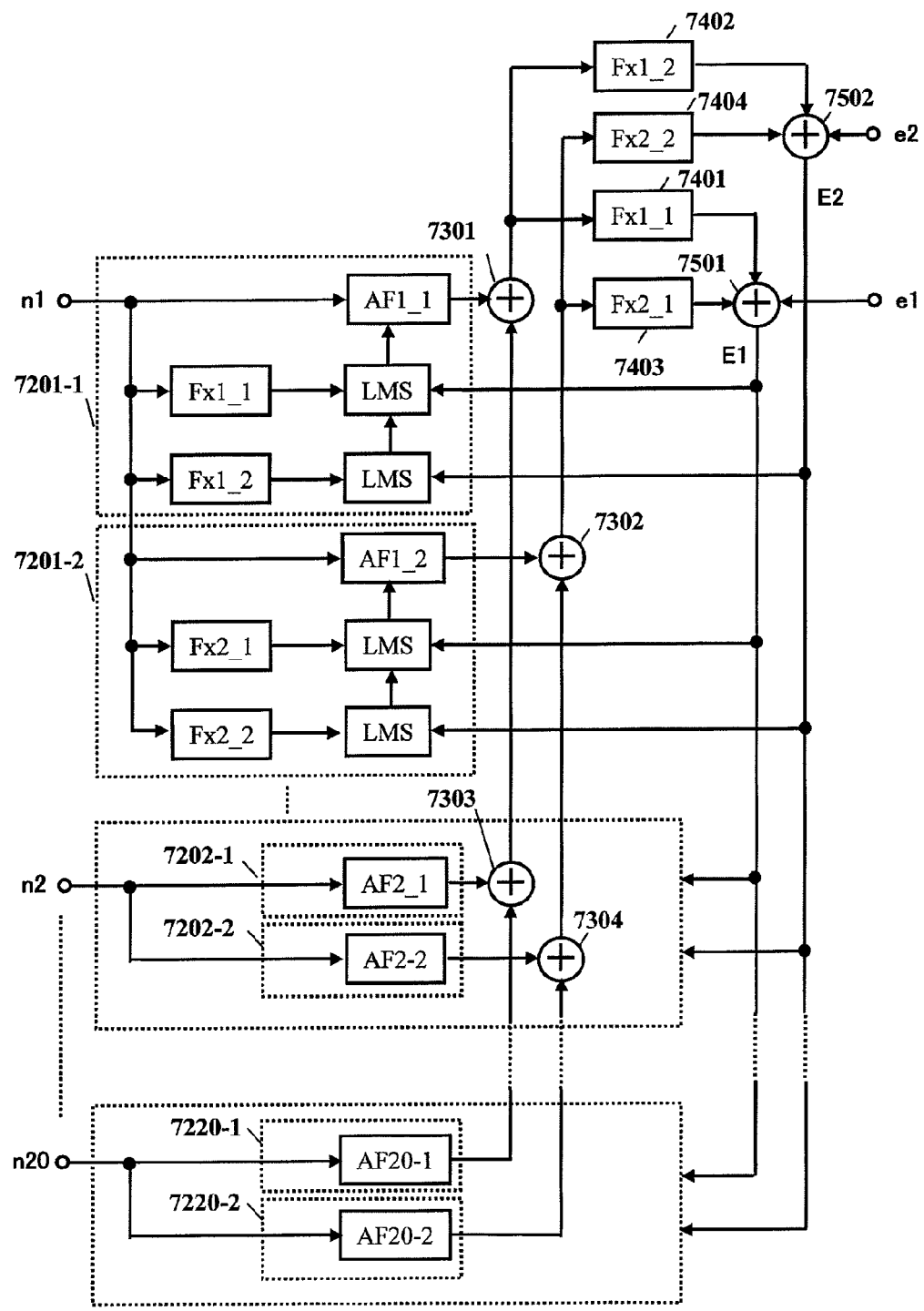
FIG. 26 is a diagram illustrating a specific circuit structure of a filter coefficient calculation section 7000.
Figure 27:
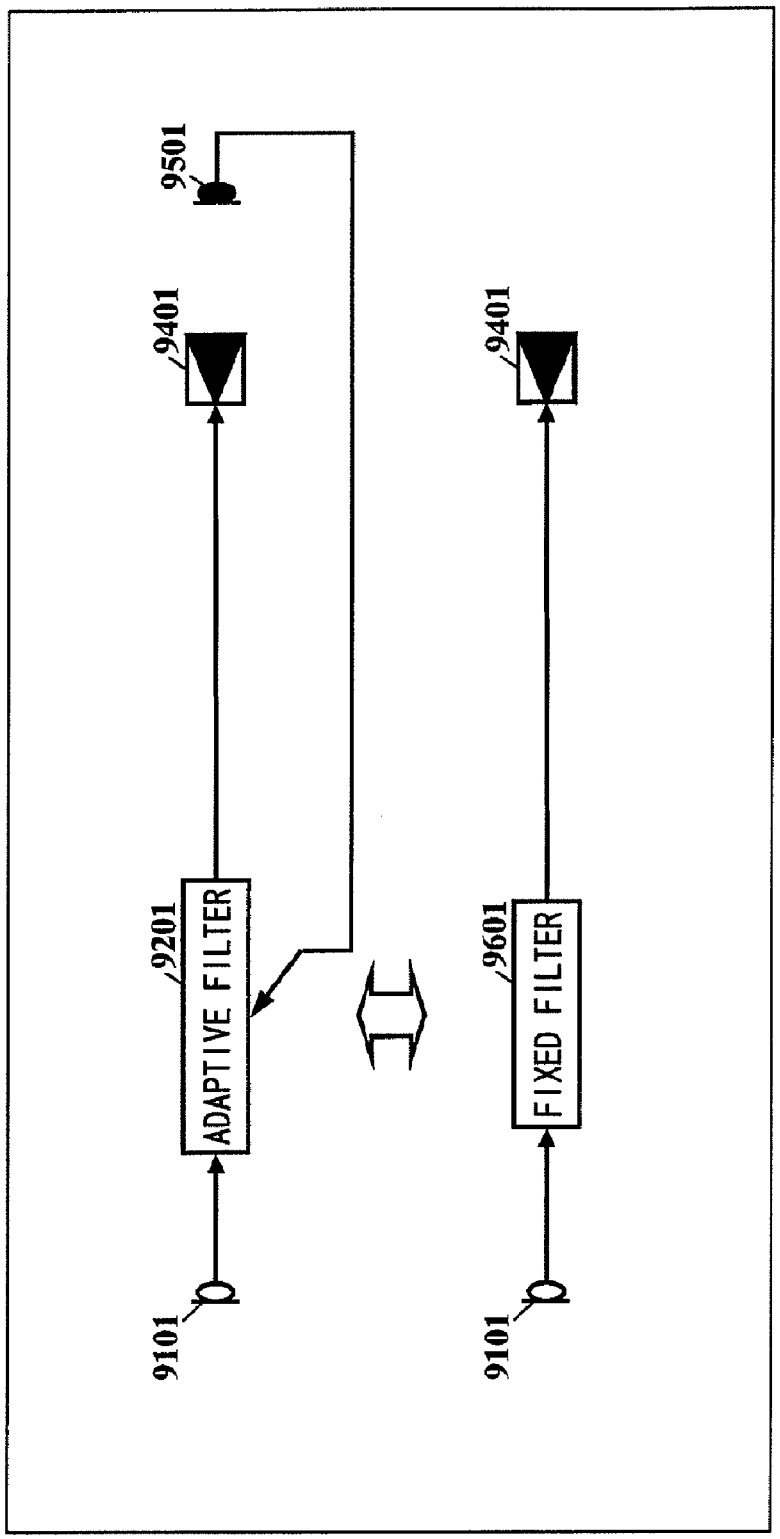
FIG. 27 is a diagram illustrating a circuit structure of a conventional noise control device.

A specific structure of the filter coefficient calculation section 7000 is shown in FIG. 26. FIG. 26 is a diagram illustrating the specific circuit structure of the filter coefficient calculation section 7000. In FIG. 26, for the sake of simplicity, description will be given with regard to the components for determining the filter coefficients only for the fixed filters 1201-1 to 1220-1 and the fixed filters 1201-2 to 1220-2 shown in FIG. 25. In FIG. 26, the filter coefficient calculation section 7000 includes adaptive filters 7201-1 to 7220-1, adaptive filters 7201-2 to 7220-2, adders 7301 to 7304, acoustic filters 7401 to 7404, and adders 7501 to 7502.

As described with respect to FIG. 25, the noise signals n1 to n20 from the signal storage section 7001 are outputted to the adaptive filters 7201-1 to 7220-2, respectively.

A transfer function ($Fx1\_1$) from the control speaker 1401 to the error microphone 7601 and a transfer function ($Fx1\_2$) from the control speaker 1401 to the error microphone 7602, which are required in advance for the Filtered-X_LMS algorithm, are set to each of the adaptive filters 7201-1 to 7220-1. In the same manner, a transfer function ($Fx2\_1$) from the control speaker 1402 to the error microphone 7601 and a transfer function ($Fx2\_2$) from the control speaker 1402 to the error microphone 7602 are set to each of the adaptive filters 7201-2 to 7220-2.

Each of the adaptive filters 7201-1 to 7220-1 signal-processes the inputted noise signal, using the filter coefficient set thereto, and outputs the obtained signal as a control signal to a corresponding one of adders 7301 and 7303, and unshown adders 7305, 7307, . . . , and 7337. The adder 7301 eventually adds up the control signals from the adaptive filters 7201-1 to 7220-1, and outputs the obtained signal to the acoustic filter 7401 and the acoustic filter 7402. Each of the adaptive filters 7201-2 to 7220-2 signal-processes the inputted noise signal, using the filter coefficient set thereto, and outputs the obtained signal as a control signal to the corresponding adder 7302 and 7404, and unshown adders 7306, 7308, . . . , and 7338. The adder 7302 eventually adds up the control signals from the adaptive filters 7201-2 to 7220-2, and outputs the obtained signal to the acoustic filter 7403 and the acoustic filter 7404.

Here, the transfer function (Fx1_1) from the control speaker 1401 to the error microphone 7601 is set to the acoustic filter 7401. The transfer function (Fx1_2) from the control speaker 1401 to the error microphone 7602 is set to the acoustic filter 7402. The transfer function (Fx2_1) from the control speaker 1402 to the error microphone 7601 is set to the acoustic filter 7403. The transfer function (Fx2_2) from the control speaker 1402 to the error microphone 7602 is set to the acoustic filter 7404.

The signals which have passed through the acoustic filter 7401 and the acoustic filter 7403 are outputted to the adder 7501. Meanwhile, the error signal e1 is outputted to the adder 7501. The adder 7501 adds these input signals. In the same manner, the signals which have passed through the acoustic filter 7402 and the acoustic filter 7404 are outputted to the adder 7502. Meanwhile, the error signal e2 is outputted to the adder 7502. The adder 7502 adds these input signals. The adaptive filters 7201-1 to 7220-2 use the addition results at the adders 7501 and 7502 as coefficient-updating error signals E1 and E2 therefor, respectively, and each of the adaptive filters 7201-1 to 7220-2 has its filter coefficient updated so as to minimize these coefficient-updating error signals E1 and E2.

Here, as described with reference to FIG. 25, the noise signals n1 to n20 and the error signals e1 to e4 are stored as the data corresponding to a predetermined duration (for example, 1 minute). Thus, the filter coefficient calculation section 7000 is allowed to use the data repeatedly until the filter coefficients at each of the adaptive filters 7201-1 to 7220-2 have converged. Moreover, the filter coefficient calculation section 7000 is independent of the controlling filter section 1000 that are connected to each of the speakers 1401 to 1404 which reproduce a control sound, and thus is capable of performing processing, independent of the processing speed at the controlling filter section 1000. In other words, while the controlling filter section 1000 performs the real-time operation in which the processing needs to be completed in a predetermined sampling period, the filter coefficient calculation section 7000 need not finish the processing in the real-time sampling period.

The noise signals n1 to n20 and the error signals e1 to e4 are sampled in real time. Accordingly, the filter coefficients calculated at the filter coefficient calculation section 7000 will be those based on the sampling period even if the processing thereof takes more time than the real time. In other words, the processing time for the series of processing at the filter coefficient calculation section 7000 may have any length, independent of the real time. Accordingly, a structure of the filter coefficient calculation section 7000 capable of realizing fast processing would allow the time for calculating the filter coefficients (the time before the filter coefficients converge) to be shorten. For example, if the filter coefficient calculation section 7000 completes operation in a shorter time than a sampling period, it is possible for the filter coefficients to be calculated in a shorter time than real time. Meanwhile, a structure of the filter coefficient calculation section 7000 capable of realizing slow processing would allow reduction of the computation load, thereby reducing the amount of computation per unit time. When the filter coefficient calculation section 7000 completes processing in a later timing, all the processing in FIG. 26 may not be completed within a sampling period. For example, the processing for the adaptive filter 7201-1 may be performed in a certain sampling, and the processing for the adaptive filter 7201-2 may be performed in the immediately following sampling. Note that it is not necessary to clearly divide the processing for the adaptive filters based on the sampling period as above.

Through the coefficient update processing described above, the filter coefficient calculation section 7000 calculates the filter coefficients which reduces the noise arriving at the control point.

Then, upon the convergence of the filter coefficients updated at each of the adaptive filters 7201-1 to 7220-1 and the adaptive filters 7201-2 to 7220-2, the filter coefficient update section 5400 shown in FIG. 25 updates, at a predetermined timing, the filter coefficient set at each of the fixed filters in the controlling filter section 1000, to the corresponding filter coefficient value to which the filter coefficients thereof have converged as described above. The predetermined timing may be, for example, the timing when the filter coefficients updated at each of the adaptive filters 7201-1 to 7220-1 and the adaptive filters 7201-2 to 7220-2 converge. Alternatively, the filter coefficient may be updated once in several minutes, or once in several days. Still alternatively, the predetermined timing may be the timing of the first flight of an airplane or the timing at which, for example, renewal of equipment in an airplane has been completed.

Further, the noise control device may update the filter coefficient set at each of the fixed filters in the controlling filter section 1000, to the calculated filter coefficient, after the following processing. The noise control device gives the signal storage section 7001 an instruction to record the noise signals and error signals upon the convergence of the filter coefficients updated at each of the adaptive filters 7201-1 to 7220-2 as described above. In the filter coefficient calculation section 7000, convolution processing is performed with regard to each of the newly recorded noise signals and the corresponding coefficient value to which the coefficients at each of the fixed filters have converged, by using AF1_1, AF1_2, . . . , AF20_2 of the adaptive filters 7201-1 to 7220-2. Then, the adders 7501 and 7502 add the corresponding results via the acoustic filters 7401 to 7404 and the newly recorded error signals, respectively. The filter coefficient update section 5400, only after determining that the addition results each represent a value smaller than or equal to a predetermined value, updates each of the filter coefficients set at the fixed filters in the controlling filter section 1000, to the corresponding calculated filter coefficient. Accordingly, even if the calculation of coefficients at the filter coefficient calculation section 7000 takes time and a noise condition has changed during that time, it is possible to prevent the speakers 1401 to 1403 from reproducing wrong control sounds, thereby preventing a user from feeling uncomfortable.

As described above, in the noise control device according to the present embodiment, the effect determination section 7002 determines the noise reduction effect at each of the error microphones 7601 to 7604, in a case where the filter coefficients set at the fixed filters in the controlling filter 1000 are used. When the predetermined noise reduction effect is not achieved, the filter coefficient calculation section 7000 calculates optimum filter coefficients, independent of the real time operation at the controlling filter 1000, and then the filter coefficient update section 5400, at a predetermined timing, updates the filter coefficients set at the fixed filters in the controlling filter section 1000. Therefore, in the background of actual noise control processing, not only the calculation of the optimum filter coefficients associated with the seat location or the surrounding environment but also reduction of requirements for the throughput for filter coefficient calculation are enabled. Further, since immediate application of the calculated filter coefficients to the corresponding fixed filters in the controlling filter section 1000 is avoided, update to wrong filter coefficients is prevented. Accordingly, even in a case of a fault such as divergence of filter coefficients, control sounds are not actually reproduced, thereby preventing a user from feeling uncomfortable. Accordingly, in the noise control device, the filter coefficient set at each of the fixed filters in the controlling filter section 1000 can be changed into the optimum filter coefficient associated with the seat location or the surrounding environment, whereby the optimum noise reduction effect can always be achieved.

Note that the filter coefficient calculation section 7000 described above is also applicable to the noise control devices shown in FIG. 16, FIG. 20, and FIG. 22. That is, in the noise control devices shown in FIG. 16 and FIG. 22, the filter coefficient calculation section 7000 calculates the optimum filter coefficients, and the filter coefficient update section 5400 updates, at a predetermined timing, the fixed filter coefficients stored in the storage section 6100 and the storage section 6200, respectively. In the noise control device shown in FIG. 20, the filter coefficient calculation section 7000 calculates the optimum filter coefficients, and the filter coefficient update section 5400 updates, at a predetermined timing, the filter coefficients set at the fixed filters in the controlling filter section 1000.

Although omitted in the description above, it is needless to say that the filter coefficient calculation section 7000 is capable of calculating the filter coefficients for the noise determination sections 3000, 3500, 3600, and 3700. In such a case, the filter coefficient update section 5400 updates, at a predetermined timing, the filter coefficients set at the fixed filters in the noise determination sections 3000 and 3600. Alternatively, the filter coefficient update section 5400 updates, at a predetermined timing, the filter coefficients for the noise determination sections 3500 and 3700 stored in the storage section 6100 and the storage section 6200, respectively. Note that in this case, the acoustic filters 7401 to 7404, and the filters having set therein the transfer functions Fx1_1, Fx1_2, Fx2_1, and Fx2_2 in the adaptive filters 7201-1 to 7220-2 shown in FIG. 26 are all unnecessary.

INDUSTRIAL APPLICABILITY

The noise control device according to the present invention can eliminate a possibility that a noise arriving at a control point is increased as compared to a case where the noise control is not performed, can reduce the circuit scale thereof, and can be applied to seats in a car, a train, and an airplane, chairs and sofas in a residence, or chairs in an office, a factory, and the like.

The invention claimed is:

1. A noise control device for reducing, by emitting a control sound toward a control point, a given noise arriving at the control point, the noise control device comprising:
    a controlling noise detector for detecting the given noise to output a controlling noise signal;
    a controlling filter section, including a fixed filter having a filter coefficient fixed therein, for signal-processing the controlling noise signal outputted from the controlling noise detector, in a state where the filter coefficient is fixed in the fixed filter, to output a control signal;
    a control speaker for reducing the given noise arriving at the control point, by emitting toward the control point a control sound based on the control signal outputted from the controlling filter section;
    a noise determination section for determining whether or not the given noise arriving at the control point is a noise corresponding to the filter coefficient of the fixed filter; and
    an output control section for stopping output of the control signal from the controlling filter section when the noise determination section determines that the given noise is not a noise corresponding to the filter coefficient of the fixed filter, wherein
    the noise determination section includes:
        a determining noise detector for detecting the given noise to output a determining noise signal;
        a determining filter section for signal-processing the controlling noise signal outputted from the controlling noise detector, using a fixed filter coefficient which is preset to reduce the determining noise signal outputted from the determining noise detector;
        an adder for adding the determining noise signal outputted from the determining noise detector and the controlling noise signal outputted from the determining filter section; and
        a level determination section for determining whether or not the given noise arriving at the control point is a noise corresponding to the filter coefficient of the fixed filter, by determining whether or not a level of an output signal from the adder is higher than a predetermined threshold, and
    the output control section stops the output of the control signal from the controlling filter section, when the level determination section determines that the level of the output signal from the adder is higher than the predetermined threshold.

2. The noise control device according to claim 1, wherein the noise determination section further includes a band extraction section for extracting only a signal in a predetermined frequency band from the output signal outputted from the adder, to output the signal to the level determination section.

3. The noise control device according to claim 2, wherein
    the predetermined threshold includes a first threshold and a second threshold having a level lower than the first threshold,
    the level determination section determines whether or not the level of the output signal from the adder is higher than the first threshold, and whether or not the level of the output signal from the adder is higher than the second threshold, and
    the output control section stops the output of the control signal from the controlling filter section when the level determination section determines that the level of the output signal from the adder is higher than the first threshold, and starts the output of the control signal from the controlling filter section when the level determination section determines that the level of the output signal from the adder is equal to or lower than the second threshold.

4. The noise control device according to claim 3, further comprising:
    a storage section for storing noise information which uniquely specifies a frequency and/or a level of the given noise arriving at the control point, and a filter coefficient to be set in the fixed filter of the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing the filter coefficient set in the fixed filter of the controlling filter section, into the read filter coefficient, when the level determination section determines that the level of the output signal from the adder is equal to or lower than the predetermined threshold.

5. The noise control device according to claim 3, further comprising:

a storage section for storing noise information which uniquely specifies a frequency and/or a level of the given noise arriving at the control point, a filter coefficient to be set in the fixed filter of the controlling filter section such that the control sound from the control speaker allows reduction of the given noise having the frequency and/or the level specified by the noise information, and a filter coefficient to be set in the determining filter section to reduce the determining noise signal outputted from the determining noise detector which has detected the given noise having the frequency and/or the level specified by the noise information, the noise information, the filter coefficient to be set in the fixed filter of the controlling filter section, and the filter coefficient to be set in the determining filter section being associated with each other in the storage section;

a determining change section for reading from the storage section the filter coefficient, which is to be set in the determining filter section and associated with the noise information inputted from outside, and changing the fixed filter coefficient set in the determining filter section, into the read filter coefficient, when the level determination section determines that the level of the output signal from the adder is equal to or lower than the predetermined threshold; and a controlling change section for reading from the storage section the filter coefficient, which is to be set in the fixed filter of the controlling filter section and associated with the noise information inputted from outside, and changing the filter coefficient set in the fixed filter of the controlling filter section, into the read filter coefficient, when the level determination section determines that the level of the output signal from the adder is equal to or lower than the predetermined threshold after change processing performed by the determining change section.

6. The noise control device according to claim 2, further comprising:

a storage section for storing noise information which uniquely specifies a frequency and/or a level of the given noise arriving at the control point, and a filter coefficient to be set in the fixed filter of the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing the filter coefficient set in the fixed filter of the controlling filter section, into the read filter coefficient, when the level determination section determines that the level of the output signal from the adder is equal to or lower than the predetermined threshold.

7. The noise control device according to claim 2, further comprising:

a storage section for storing noise information which uniquely specifies a frequency and/or a level of the given noise arriving at the control point, a filter coefficient to be set in the fixed filter of the controlling filter section such that the control sound from the control speaker allows reduction of the given noise having the frequency and/or the level specified by the noise information, and a filter coefficient to be set in the determining filter section to reduce the determining noise signal outputted from the determining noise detector which has detected the given noise having the frequency and/or the level specified by the noise information, the noise information, the filter coefficient to be set in the fixed filter of the controlling filter section, and the filter coefficient to be set in the determining filter section being associated with each other in the storage section;

a determining change section for reading from the storage section the filter coefficient, which is to be set in the determining filter section and associated with the noise information inputted from outside, and changing the fixed filter coefficient set in the determining filter section, into the read filter coefficient, when the level determination section determines that the level of the output signal from the adder is equal to or lower than the predetermined threshold; and a controlling change section for reading from the storage section the filter coefficient, which is to be set in the fixed filter of the controlling filter section and associated with the noise information inputted from outside, and changing the filter coefficient set in the fixed filter of the controlling filter section, into the read filter coefficient, when the level determination section determines that the level of the output signal from the adder is equal to or lower than the predetermined threshold after change processing performed by the determining change section.

8. The noise control device according to claim 1, wherein the predetermined threshold includes a first threshold and a second threshold having a level lower than the first threshold, the level determination section determines whether or not the level of the output signal from the adder is higher than the first threshold, and whether or not the level of the output signal from the adder is higher than the second threshold, and the output control section stops the output of the control signal from the controlling filter section when the level determination section determines that the level of the output signal from the adder is higher than the first threshold, and starts the output of the control signal from the controlling filter section when the level determination section determines that the level of the output signal from the adder is equal to or lower than the second threshold.

9. The noise control device according to claim 8, further comprising:

a storage section for storing noise information which uniquely specifies a frequency and/or a level of the given noise arriving at the control point, and a filter coefficient to be set in the fixed filter of the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing the filter coefficient set in the fixed filter of the controlling filter section, into the read filter coefficient, when the level determination section determines that the level of the output signal from the adder is equal to or lower than the predetermined threshold.

10. The noise control device according to claim 8, further comprising:

a storage section for storing noise information which uniquely specifies a frequency and/or a level of the given noise arriving at the control point, a filter coefficient to be set in the fixed filter of the controlling filter section such that the control sound from the control speaker allows reduction of the given noise having the frequency and/or the level specified by the noise information, and a filter coefficient to be set in the determining filter section to reduce the determining noise signal outputted from the determining noise detector which has detected the given noise having the frequency and/or the level specified by the noise information, the noise information, the filter coefficient to be set in the fixed filter of the controlling filter section, and the filter coefficient to be set in the determining filter section being associated with each other in the storage section;

a determining change section for reading from the storage section the filter coefficient, which is to be set in the determining filter section and associated with the noise information inputted from outside, and changing the fixed filter coefficient set in the determining filter section, into the read filter coefficient, when the level determination section determines that the level of the output signal from the adder is equal to or lower than the predetermined threshold; and a controlling change section for reading from the storage section the filter coefficient, which is to be set in the fixed filter of the controlling filter section and associated with the noise information inputted from outside, and changing the filter coefficient set in the fixed filter of the controlling filter section, into the read filter coefficient, when the level determination section determines that the level of the output signal from the adder is equal to or lower than the predetermined threshold after change processing performed by the determining change section.

11. The noise control device according to claim 1, further comprising:

a storage section for storing noise information which uniquely specifies a frequency and/or a level of the given noise arriving at the control point, and a filter coefficient to be set in the fixed filter of the controlling filter section such that the control sound from the control speaker allows reduction of the given noise having the frequency and/or the level specified by the noise information, the noise information and the filter coefficient being associated with each other in the storage section; and a controlling change section for reading from the storage section the filter coefficient associated with the noise information inputted from outside and changing the filter coefficient set in the fixed filter of the controlling filter section, into the read filter coefficient, when the level determination section determines that the level of the output signal from the adder is equal to or lower than the predetermined threshold.

12. The noise control device according to claim 1, further comprising:

a storage section for storing noise information which uniquely specifies a frequency and/or a level of the given noise arriving at the control point, a filter coefficient to be set in the fixed filter of the controlling filter section such that the control sound from the control speaker allows reduction of the given noise having the frequency and/or the level specified by the noise information, and a filter coefficient to be set in the determining filter section to reduce the determining noise signal outputted from the determining noise detector which has detected the given noise having the frequency and/or the level specified by the noise information, the noise information, the filter coefficient to be set in the fixed filter of the controlling filter section, and the filter coefficient to be set in the determining filter section being associated with each other in the storage section;

a determining change section for reading from the storage section the filter coefficient, which is to be set in the determining filter section and associated with the noise information inputted from outside, and changing the fixed filter coefficient set in the determining filter section, into the read filter coefficient, when the level determination section determines that the level of the output signal from the adder is equal to or lower than the predetermined threshold; and a controlling change section for reading from the storage section the filter coefficient, which is to be set in the fixed filter of the controlling filter section and associated with the noise information inputted from outside, and changing the filter coefficient set in the fixed filter of the controlling filter section, into the read filter coefficient, when the level determination section determines that the level of the output signal from the adder is equal to or lower than the predetermined threshold after change processing performed by the determining change section.

13. A noise control device for reducing, by emitting a control sound toward a control point, a given noise arriving at the control point, the noise control device comprising:

a controlling noise detector for detecting the given noise to output a controlling noise signal;

a controlling filter section, including a fixed filter having a filter coefficient fixed therein, for signal-processing the controlling noise signal outputted from the controlling noise detector, in a state where the filter coefficient is fixed in the fixed filter, to output a control signal;

a control speaker for reducing the given noise arriving at the control point, by emitting toward the control point a control sound based on the control signal outputted from the controlling filter section;

a noise determination section for determining whether or not the given noise arriving at the control point is a noise corresponding to the filter coefficient of the fixed filter; and an output control section for stopping output of the control signal from the controlling filter section when the noise determination section determines that the given noise is not a noise corresponding to the filter coefficient of the fixed filter, wherein a plurality of the controlling noise detectors are provided, the controlling filter section is provided with a plurality of fixed filters which have fixed therein filter coefficients associated with the plurality of the controlling noise detectors, respectively, and the controlling filter section signal-processes the controlling noise signal outputted from each of the plurality of the controlling noise detectors, using a corresponding one of the filter coefficients, which are associated therewith, and fixed in the plurality of fixed filters, to output a control signal resulting from the signal-processing, the control speaker reduces the given noise arriving at the control point, by emitting toward the control point the control sound based on the control signals from the controlling filter section, the noise determination section includes:
a determining filter section for signal-processing, using a plurality of fixed filter coefficients which are preset to reduce the controlling noise signal from one of the plurality of the controlling noise detectors and to be associated with the others of the plurality of the controlling noise detectors, the controlling noise signal from each of the others of the plurality of the controlling noise detectors;
an adder for adding the controlling noise signal from the one of the plurality of the controlling noise detectors and the controlling noise signals from the determining filter section; and
a level determination section for determining whether or not a level of an output signal from the adder is higher than a predetermined threshold, and the output control section stops the output of the control signals from the controlling filter section, when the level determination section determines that the level of the output signal from the adder is higher than the predetermined threshold.

14. A noise control device for reducing, by emitting a control sound toward a control point, a given noise arriving at the control point, the noise control device comprising:
a controlling noise detector for detecting the given noise to output a controlling noise signal;
a controlling filter section, including a fixed filter having a filter coefficient fixed therein, for signal-processing the controlling noise signal outputted from the controlling noise detector, in a state where the filter coefficient is fixed in the fixed filter, to output a control signal;
a control speaker for reducing the given noise arriving at the control point, by emitting toward the control point a control sound based on the control signal outputted from the controlling filter section;
a noise determination section for determining whether or not the given noise arriving at the control point is a noise corresponding to the filter coefficient of the fixed filter; and
an output control section for stopping output of the control signal from the controlling filter section when the noise determination section determines that the given noise is not a noise corresponding to the filter coefficient of the fixed filter, wherein the noise determination section determines whether or not the given noise arriving at the control point is a noise corresponding to the filter coefficient of the fixed filter, by receiving noise information which uniquely specifies a frequency and/or a level of the given noise arriving at the control point, and by determining, based on the noise information, whether or not a variation amount of the frequency and/or the level of the given noise arriving at the control point is larger than a predetermined amount, and the output control section stops the output of the control signal from the controlling filter section when the noise determination section determines that the variation amount of the frequency and/or the level is larger than the predetermined amount.

15. The noise control device according to claim 14, further comprising:
a storage section for storing the noise information and a filter coefficient to be set in the fixed filter of the controlling filter section such that the control sound from the control speaker allows reduction of the given noise having the frequency and/or the level specified by the noise information, the noise information and the filter coefficient being associated with each other in the storage section; and
a controlling change section for reading from the storage section the filter coefficient associated with the noise information inputted from outside and changing the filter coefficient set in the fixed filter of the controlling filter section, into the read filter coefficient, when the noise determination section determines that the variation amount of the frequency and/or the level is equal to or less than the predetermined amount.

16. A noise control device for reducing, by emitting a control sound toward a control point, a given noise arriving at the control point, the noise control device, comprising:
a controlling noise detector for detecting the given noise to output a controlling noise signal;
a controlling filter section, including a fixed filter having a filter coefficient fixed therein, for signal-processing the controlling noise signal outputted from the controlling noise detector, in a state where the filter coefficient is fixed in the fixed filter, to output a control signal;
a control speaker for reducing the given noise arriving at the control point, by emitting toward the control point a control sound based on the control signal outputted from the controlling filter section;
a noise determination section for determining whether or not the given noise arriving at the control point is a noise corresponding to the filter coefficient of the fixed filter;
an output control section for stopping output of the control signal from the controlling filter section when the noise determination section determines that the given noise is not a noise corresponding to the filter coefficient of the fixed filter;
an error detector, provided at the control point, for detecting a combined signal generated by combining a noise and the control sound from the control speaker;
a signal storage section for storing the controlling noise signal detected by the controlling noise detector and an error signal detected by the error detector;
a filter coefficient calculation section for calculating the filter coefficient for the fixed filter of the controlling filter section, by using the controlling noise signal and the error signal, both stored in the signal storage section; and
a filter coefficient update section for updating, at a predetermined timing, the filter coefficient set in the fixed filter of the controlling filter section, to the filter coefficient calculated at the filter coefficient calculation section.

17. The noise control device according to claim 16, further comprising an effect determination section for determining a signal level of the error signal detected by the error detector, wherein start of storing operation at the signal storage section and stop of operation at the controlling filter section are controlled depending on determination at the effect determination section.

18. The noise control device according to claim 16, wherein the filter coefficient calculation section includes:

an adaptive filter for signal-processing the controlling noise signal stored in the signal storage section;

an acoustic filter for signal-processing an output from the adaptive filter; and an adder for adding an output signal from the acoustic filter and the error signal stored in the signal storage section, a transfer function from the controlling speaker to the error detector is set, as a coefficient, to the acoustic filter, and the adaptive filter has its coefficient updated so as to minimize an addition result at the adder as a coefficient-updating error signal.

19. The noise control device according to claim 16, wherein the predetermined timing is one of (i) a time when the filter coefficient updated by the filter coefficient update section converges, and (ii) a time determined according to a fixed cycle.

20. The noise control device according to claim 16, wherein the filter coefficient calculation section and the filter coefficient update section operate regardless of a real time operation of the controlling filter section.

* * * * *